(12) United States Patent
Park et al.

(10) Patent No.: US 11,960,676 B2
(45) Date of Patent: Apr. 16, 2024

(54) TRANSPARENT DISPLAY DEVICE WITH TOUCH SENSOR

(71) Applicant: LG Display Co., Ltd., Seoul (KR)

(72) Inventors: JaeHee Park, Paju-si (KR); MiReum Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/977,922

(22) Filed: Oct. 31, 2022

(65) Prior Publication Data

US 2023/0195252 A1 Jun. 22, 2023

(30) Foreign Application Priority Data

Dec. 21, 2021 (KR) .......................... 10-2021-0183630

(51) Int. Cl.
*G06F 3/041* (2006.01)
*G06F 3/044* (2006.01)

(52) U.S. Cl.
CPC .......... *G06F 3/04164* (2019.05); *G06F 3/044* (2013.01)

(58) Field of Classification Search
CPC .............................. G06F 3/044; G06F 3/04164
USPC .................................................. 345/173–174
See application file for complete search history.

(56) References Cited

U.S. PATENT DOCUMENTS

| | | | | |
|---|---|---|---|---|
| 10,541,280 | B1* | 1/2020 | Krah | G06F 3/0446 |
| 2015/0091850 | A1* | 4/2015 | Morein | G06F 3/0412 |
| | | | | 345/174 |
| 2015/0378486 | A1* | 12/2015 | Yu | G06F 3/04164 |
| | | | | 427/79 |
| 2018/0143721 | A1* | 5/2018 | Matsueda | G06F 3/0412 |
| 2021/0165528 | A1* | 6/2021 | You | G06F 3/0412 |
| 2021/0242284 | A1* | 8/2021 | Kim | G06F 3/0445 |

FOREIGN PATENT DOCUMENTS

WO WO-2021038392 A1 * 3/2021 ........... G06F 3/0412

* cited by examiner

*Primary Examiner* — Kwin Xie
(74) *Attorney, Agent, or Firm* — Seed IP Law Group LLP

(57) ABSTRACT

A transparent display device with a touch sensor is provided, which may minimize or reduce loss of light transmittance due to a touch sensor and a touch line and may detect a defective touch sensor among a plurality of touch sensors provided in a touch block. The transparent display device comprises a substrate provided with a transmissive area and a non-transmissive area, a touch sensor provided in the transmissive area over the substrate, including a touch sensor electrode, a pixel provided in the non-transmissive area over the substrate, including a plurality of light emitting elements comprised of an anode electrode, a light emitting layer and a cathode electrode, a reference line provided in the non-transmissive area, a plurality of switching transistors connecting the reference line with each of the plurality of light emitting elements, and a touch transistor connecting the reference line with the touch sensor.

20 Claims, 15 Drawing Sheets

TRANSPARENT DISPLAY DEVICE WITH TOUCH SENSOR

BACKGROUND

Technical Field

The present disclosure relates to a transparent display device with a touch sensor.

Description of the Related Art

Recently, studies for a transparent display device in which a user may view objects or images positioned at an opposite side through the display device are actively ongoing. The transparent display device includes a display area on which an image is displayed, wherein the display area may include a transmissive area capable of transmitting external light and a non-transmissive area, and may have high light transmittance through the transmissive area.

A transparent display device may be provided with a plurality of touch sensors and a plurality of touch lines to implement a touch function.

BRIEF SUMMARY

The inventors have realized that forming the plurality of touch sensors and the plurality of touch lines in a transparent display device is difficult and is associated with a complicated process. Further, light transmittance may be reduced due to the plurality of touch sensors and the plurality of touch lines.

The present disclosure has been made in view of the above problems and it is technical benefit of the present disclosure to provide a transparent display device that may reduce or minimize loss of light transmittance due to a touch sensor and a touch line.

It is another technical benefit of the present disclosure to provide a transparent display device that may detect a defective touch sensor among a plurality of touch sensors provided in a touch block.

In addition to the technical benefits of the present disclosure as mentioned above, additional technical benefits and features of the present disclosure will be clearly understood by those skilled in the art from the following description of the present disclosure.

In accordance with an aspect of the present disclosure, the above and other technical benefits can be accomplished by the provision of a transparent display device with a touch sensor, the transparent display device comprising a substrate provided with a transmissive area and a non-transmissive area, a touch sensor provided in the transmissive area on the substrate, including a touch sensor electrode, a pixel provided in the non-transmissive area on the substrate, including a plurality of light emitting elements having an anode electrode, a light emitting layer and a cathode electrode, a reference line provided in the non-transmissive area, a plurality of switching transistors connecting the reference line with each of the plurality of light emitting elements, and a touch transistor connecting the reference line with the touch sensor.

BRIEF DESCRIPTION OF THE SEVERAL VIEWS OF THE DRAWINGS

The above and other technical benefits, features and other advantages of the present disclosure will be more clearly understood from the following detailed description taken in conjunction with the accompanying drawings, in which.

DETAILED DESCRIPTION

Figure 1:
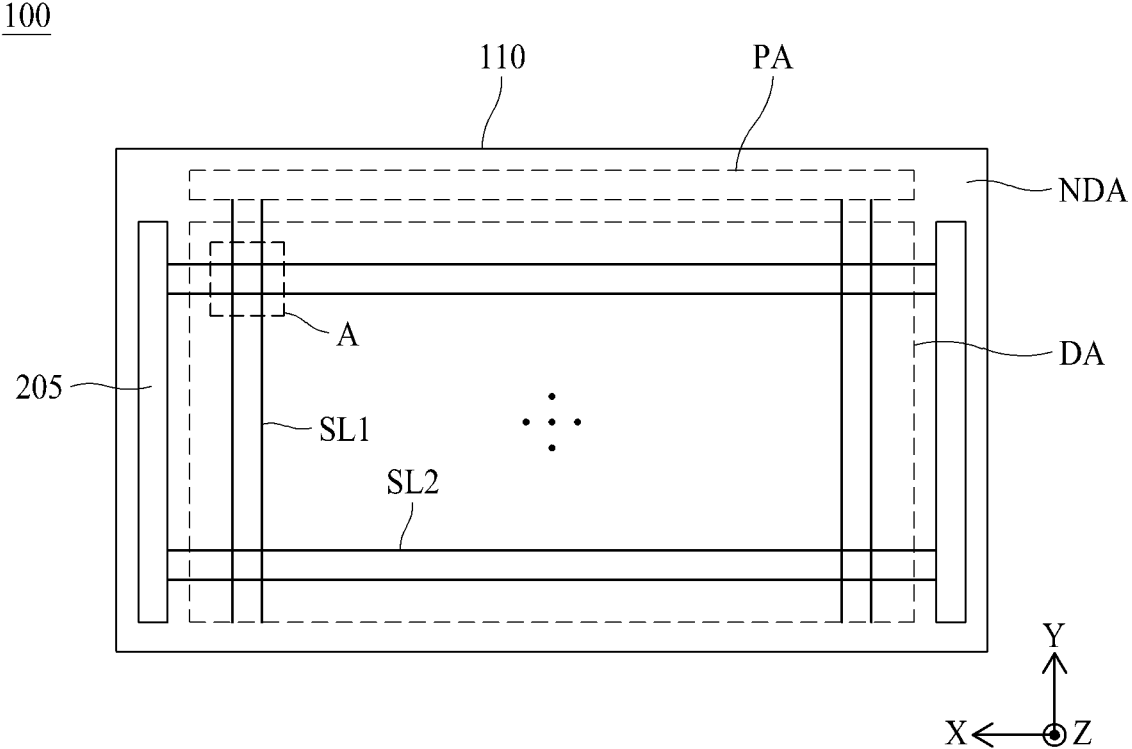
FIG. 1 is a schematic plan view illustrating a transparent display panel.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~,' 'above~,'

'below,~, and 'next to~, one or more portions may be arranged between two other portions unless 'just' or 'direct' is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," etc., may be used. These terms are intended to identify the corresponding elements from the other elements, and basis, order, or number of the corresponding elements are not limited by these terms. The expression that an element is "connected" or "coupled" to another element should be understood as that the element may be directly connected or coupled to another element when described explicitly as such, or that otherwise a third element may be interposed between the corresponding elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

FIG. 1 is a schematic plan view illustrating a transparent display panel.

Hereinafter, X axis indicates a line parallel with a scan line, Y axis indicates a line parallel with a data line, and Z axis indicates a height direction of a transparent display device 100. Although a description has been described based on that the transparent display device 100 according to one embodiment of the present disclosure is embodied as an organic light emitting display device, the transparent display device 100 may be embodied as a liquid crystal display device, a plasma display panel (PDP), a Quantum dot Light Emitting Display (QLED) or an Electrophoresis display device.

Referring to FIG. 1, a transparent display device according to one embodiment of the present disclosure includes a transparent display panel 110. The transparent display panel 110 may include a display area DA provided with pixels to display an image, and a non-display area NDA for not displaying an image.

The display area DA may be provided with a first signal lines SL1, a second signal lines SL2 and the pixels. The non-display area NDA may be provided with a pad area PA in which pads are disposed, and at least one gate driver 205.

The first signal lines SL1 may be extended in a first direction (e.g., Y-axis direction). The first signal lines SL1 may cross the second signal lines SL2 in the display area DA. The second signal lines SL2 may be extended in the display area DA in a second direction (e.g., X-axis direction). The pixel may be provided in an area where the first signal line SL1 is provided or in an area where the first signal line SL1 and the second signal line SL2 cross each other, and emits predetermined or selected light to display an image.

The gate driver 205 are connected to the scan lines and supplies scan signals to the scan lines. The gate driver 205 may be disposed in the non-display area NDA on one side or both sides of the display area DA of the transparent display panel 110 by a gate driver in panel (GIP) method or a tape automated bonding (TAB) method.

The transparent display panel 110 may further include a touch line and a touch sensor in addition to the first signal line SL1, the second signal line SL2 and the pixel in order to implement a touch function. A detailed description of the touch line and the touch sensor will be described later with reference to FIGS. 2 to 16.

Figure 2:
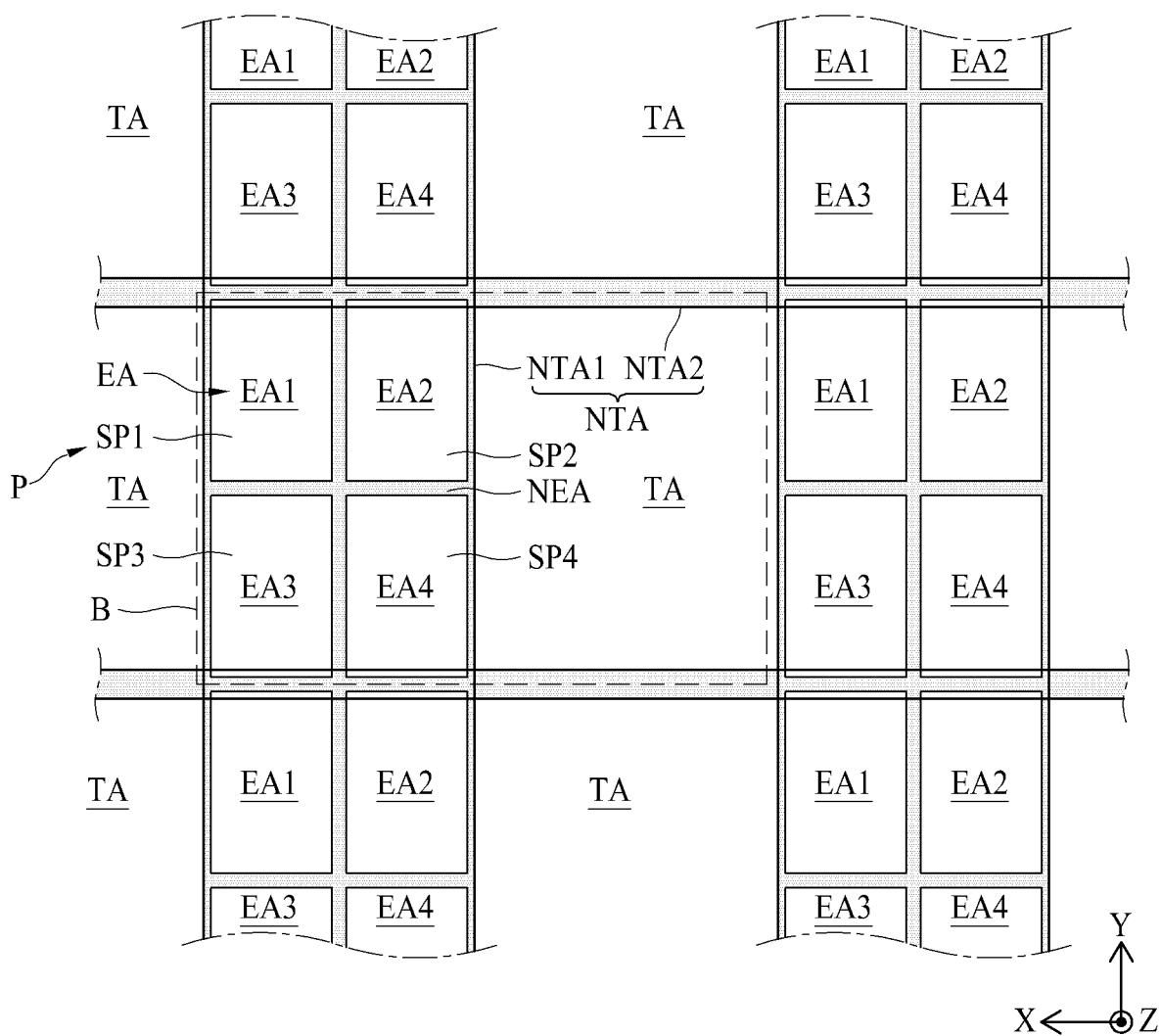
FIG. 2 is a schematic view illustrating an example of a pixel provided in an area A of FIG. 1.
Figure 3:
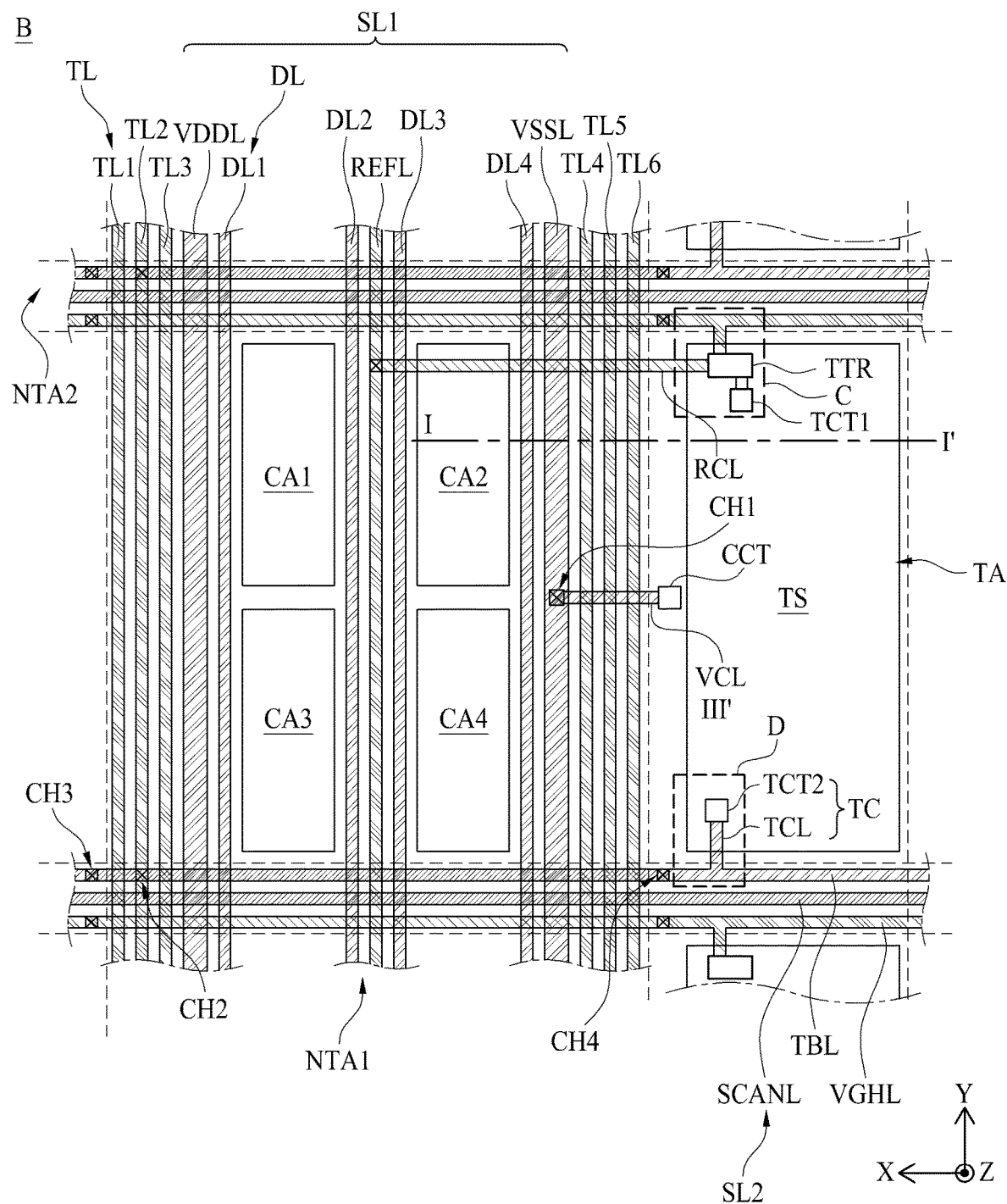
FIG. 3 is a view illustrating an example of signal lines, touch lines and a touch sensor, which are provided in an area B of FIG. 2.

FIG. 2 is a schematic view illustrating an example of a pixel provided in an area A of FIG. 1 and FIG. 3 is a view illustrating an example of signal lines, touch lines and a touch sensor, which are provided in an area B of FIG. 2.

Referring to FIGS. 2 and 3, the display area DA includes a transmissive area TA and a non-transmissive area NTA. The transmissive area TA is an area through which most of externally incident light passes, and the non-transmissive area NTA is an area through which most of externally incident light fails to transmit. For example, the transmissive area TA may be an area where light transmittance is greater than $\alpha$ %, for example, about 90%, and the non-transmissive area NTA may be an area where light transmittance is smaller than $\beta$%, for example, about 50%. At this time, $\alpha$ is greater than $\beta$. A user may view an object or background arranged over a rear surface of the transparent display panel 110 due to the transmissive area TA.

The non-transmissive area NTA may include a first non-transmissive area NTA1, a second non-transmissive area NTA2 and a plurality of pixels P. Pixels P may be provided in the first non-transmissive area NTA1 or in an overlapping area where the first non-transmissive area NTA1 and a second non-transmissive area NTA2 overlap, and emit predetermined or selected light to display an image. A light emission area EA may correspond to an area, from which light is emitted, in the pixel P.

Each of the pixels P, as shown in FIG. 2, may include at least one of a first subpixel SP1, a second subpixel SP2, a third subpixel SP3 and a fourth subpixel SP4. The first subpixel SP1 may include a first light emission area EA1 emitting light of a first color. The second subpixel SP2 may include a second light emission area EA2 emitting light of a second color. The third subpixel SP3 may include a third light emission area EA3 emitting light of a third color. The fourth subpixel SP4 may include a fourth light emission area EA4 emitting light of a fourth color.

The first to fourth light emission area EA1, EA2, EA3 and EA4 may emit light of different colors. For example, the first light emission area EA1 may emit light of a green color. The second light emission area EA2 may emit light of a red color. The third light emission area EA3 may emit light of a blue color. The fourth light emission area EA4 may emit light of a white color. However, the light emission areas are not limited to this example. Each of the pixels P may further include a subpixel emitting light of a color other than red, green, blue and white. Also, the arrangement order of the subpixels SP1, SP2, SP3 and SP4 may be changed in various ways.

The first non-transmissive area NTA1 may be extended in a first direction (e.g., Y-axis direction) in a display area DA, and may be disposed to at least partially overlap light emission areas EA1, EA2, EA3 and EA4. A plurality of first non-transmissive areas NTA1 may be provided in the transparent display panel 110, and a transmissive area TA may be provided between two adjacent first non-transmissive areas NTA1. In the first non-transmissive area NTA1, first signals lines SL1 extended in the first direction (e.g., Y-axis direction) and touch lines TL extended in the first direction (e.g., Y-axis direction) may be disposed to be spaced apart from each other.

For example, the first signal lines SL1 may include at least one of a pixel power line VDDL, a common power line VSSL, a reference line REFL and data lines DL1, DL2, DL3 and DL4.

The pixel power line VDDL may supply a first power source to a driving transistor DTR of each of subpixels SP1, SP2, SP3 and SP4 provided in the display area DA. The first power source may be an anode power source.

The common power line VSSL may supply a second power source to a cathode electrode of the subpixels SP1, SP2, SP3 and SP4 provided in the display area DA. At this time, the second power source may be a cathode power source. The cathode power source may be a common power source commonly supplied to the subpixels SP1, SP2, SP3 and SP4.

The common power line VSSL may supply the cathode power source to the cathode electrode through a cathode contact portion CCT. The cathode contact portion CCT may be provided between the transmissive area TA and the common power line VSSL. A power connection line VCL may be disposed between the common power line VSSL and the cathode contact portion CCT. One end of the power connection line VCL may be connected to the common power line VSSL through a first contact hole CH1 and the other end thereof may be connected to the cathode contact portion CCT. The cathode electrode may be connected to the cathode contact portion CCT. As a result, the cathode electrode may be electrically connected to the common power line VSSL through the power connection line VCL and the cathode contact portion CCT.

The reference line REFL may supply an initialization voltage (or reference voltage) to the driving transistor DTR of each of the subpixels SP1, SP2, SP3 and SP4 provided in the display area DA. The reference line REFL may be disposed between the plurality of data lines DL1, DL2, DL3 and DL4. For example, the reference line REFL may be disposed at the center of the plurality of data lines DL1, DL2, DL3 and DL4, that is, between the second data line DL2 and the third data line DL3.

The reference line REFL may be diverged and connected to the plurality of subpixels SP1, SP2, SP3 and SP4. In detail, the reference line REFL may be connected to circuit elements of the plurality of subpixels SP1, SP2, SP3 and SP4 to supply an initialization voltage (or reference voltage) to each of the subpixels SP1, SP2, SP3 and SP4.

When the reference line REFL is disposed to be close to the edge of the first non-transmissive area NTA1, a deviation between connection lengths from a diverged point to a circuit element of a plurality of subpixels SP1, SP2, SP3 and SP4 is increased. In a transparent display panel 110 according to one embodiment of the present disclosure, the reference line REFL is disposed in a middle area of the first non-transmissive area NTA1, whereby the deviation between the connection lengths to the circuit element of each of the plurality of subpixels SP1, SP2, SP3 and SP4 may be reduced or minimized. Therefore, the reference line REFL may uniformly supply signals to the circuit elements of the plurality of subpixels SP1, SP2, SP3 and SP4.

Also, the reference line REFL may be connected to the touch transistor TTR. The reference line REFL may include a reference connection line RCL extending in the second direction (e.g., X-axis direction), and the touch transistor TTR provided in the transmission area TA through the reference connection line RCL. The reference connection line RCL may be connected to the reference line REFL at one end and may be connected to the touch transistor TTR at the other end. In this case, the reference connection line RCL may be formed of a single layer, but is not limited thereto. The reference connection line RCL may be formed of a plurality of layers so as not to be connected to the first signal lines SL1 that extend in the second direction (e.g., X-axis direction) and cross.

Each of the data lines DL1, DL2, DL3 and DL4 may supply a data voltage to the subpixels SP1, SP2, SP3 and SP4. For example, the first data line DL1 may supply a first data voltage to a first driving transistor of the first subpixel SP1, the second data line DL2 may supply a second data voltage to a second driving transistor of the second subpixel SP2, the third data line DL3 may supply a third data voltage to a third driving transistor of the third subpixel SP3 and the fourth data line DL4 may supply a fourth data voltage to a fourth driving transistor of the fourth subpixel SP4.

In the transparent display panel 110 according to one embodiment of the present disclosure, the touch line TL may be further disposed in the first non-transmissive area NTA1. At least two touch lines TL may be provided in one first non-transmissive area NTA1. When the plurality of touch lines TL are disposed in the transmissive area TA of the transparent display panel 110, light transmittance may be deteriorated due to the plurality of touch lines TL.

Also, a slit, specifically an elongated linear or rectangular shape, may be provided between the plurality of touch lines TL. When external light passes through the slit, a diffraction phenomenon may occur. According to the diffraction phenomenon, light corresponding to plane waves may be changed to spherical waves as the light passes through the slit, and an interference phenomenon may occur in the spherical waves. Therefore, constructive interference and destructive interference occur in the spherical waves, whereby the external light that has passed through the slit may have irregular light intensity. As a result, in the transparent display panel 110, definition of an object or image positioned at an opposite side may be reduced. For this reason, the plurality of touch lines TL are preferably disposed in the first non-transmissive area NTA1 rather than the transmissive area TA.

A plurality of touch lines TL may be disposed between first signal lines SL1 in the first non-transmissive area NTA1 and a transmissive area TA as shown in FIG. 3. For example, six touch lines TL1, TL2, TL3, TL4, TL5 and TL6 may be disposed in one first non-transmissive area NTA1. Three touch lines TL1, TL2 and TL3 of the six touch lines TL1, TL2, TL3, TL4, TL5 and TL6 may be disposed between a pixel power line VDDL and the transmissive area TA, and the other three touch lines TL4, TL5 and TL6 may be disposed between a common power line VSSL and the transmissive area TA, but are not limited to this arrangement. The plurality of touch lines TL are advantageous so as not to overlap circuit areas CA1, CA2, CA3 and CA4 in which circuit elements are disposed, and various modifications may be made in the arrangement order of the plurality of touch lines TL with the first signal lines SL1.

The transparent display panel 110 according to one embodiment of the present disclosure includes a pixel P between adjacent transmissive areas TA, and the pixel P may include light emission areas EA1, EA2, EA3 and EA4 in which a light emitting element is disposed to emit light. Since a size of the non-transmissive area NTA is small in the transparent display panel 110, the circuit element may be disposed to at least partially overlap the light emission areas EA1, EA2, EA3 and EA4. That is, the light emission areas EA1, EA2, EA3 and EA4 may include circuit areas CAL CA2, CA3 and CA4 in which circuit elements are disposed.

For example, the circuit areas may include a first circuit area CA1 in which a circuit element connected to the first subpixel SP1 is disposed, a second circuit area CA2 in which a circuit element connected to the second subpixel SP2 is disposed, a third circuit area CA3 in which a circuit element connected to the third subpixel SP3 is disposed, and a fourth circuit area CA4 in which a circuit element connected to the fourth subpixel SP4 is disposed.

In the transparent display panel 110 according to one embodiment of the present disclosure, a plurality of touch lines TL do not overlap circuit areas CAL CA2, CA3 and CA4, so that parasitic capacitance of the touch lines TL due to a circuit element may be reduced or minimized.

Furthermore, the transparent display panel 110 according to one embodiment of the present disclosure may reduce a horizontal distance difference between the touch lines TL. Since at least two transistors and a capacitor are disposed in the circuit areas CAL CA2, CA3 and CA4, the touch lines TL may be difficult to be formed in a straight line in the circuit areas CAL CA2, CA3, and CA4, and may be difficult to have a constant horizontal distance. Therefore, the horizontal distance difference between the touch lines TL is increased, whereby uniformity of the parasitic capacitance may be very low.

In the transparent display panel 110 according to one embodiment of the present disclosure, the touch lines TL may be disposed so as not to overlap the circuit areas CAL CA2, CA3 and CA4, whereby an influence of the circuit element may be reduced and at the same time the horizontal distance difference between the touch lines TL may be reduced to improve uniformity of the parasitic capacitance.

The second non-transmissive area NTA2 may be extended from the display area DA in the second direction (e.g., X-axis direction) as shown in FIG. 3 and may be disposed to at least partially overlap the light emission areas EA1, EA2, EA3 and EA4. The plurality of second non-transmissive areas NTA2 may be provided in the transparent display panel 110, and a transmissive area TA may be provided between two adjacent second non-transmissive areas NTA2. A second signal line SL2, a touch bridge line TBL and a gate-on voltage line VGHL may be spaced apart from one another in the second non-transmissive area NTA2.

The second signal line SL2 may be extended in the second direction (e.g., X-axis direction), and may include, for example, a scan line SCANL. The scan line SCANL may supply a scan signal to the subpixels SP1, SP2, SP3 and SP4 of the pixel P.

The touch bridge line TBL may connect any one of the plurality of touch lines TL with the touch sensor TS. The touch bridge line TBL may be connected to any one of the plurality of touch lines TL through a second contact hole CH2. Further, the touch bridge line TBL may be connected to at least two touch sensors TS arranged in the second direction (e.g., X-axis direction) while being extended in the second direction (e.g., X-axis direction).

In one embodiment, the touch bridge line TBL may be formed of a plurality of layers, e.g., two layers. The touch bridge line TBL may include a first touch bridge line disposed in a first layer in an area overlapped with the first non-transmissive area NTA1 and a second touch bridge line disposed in a second layer in an area that is not overlapped with the first non-transmissive area NTA1. One first touch bridge line may be connected to one second touch bridge line at one end through a third contact hole CH3, and may be connected to another second touch bridge line at the other end through a fourth contact hole CH4. For example, the first layer may be the same layer as a gate electrode of a driving transistor, and the second layer may be the same layer as a source electrode and a drain electrode of the driving transistor.

The gate-on voltage line VGHL may apply a gate-on voltage to a touch transistor TTR. The gate-on voltage line VGHL may be connected to at least two touch transistors TTR arranged in the second direction (e.g., X-axis direction) while being extended in the second direction (e.g., X-axis direction). In FIG. 3, the gate-on voltage line VGHL is provided in the second non-transmissive area NTA2, but is not limited thereto. The gate-on voltage line VGHL may be provided in the first non-transmissive area NTA1. In this case, the gate-on voltage line VGHL may be connected to at least two touch transistors TTR arranged in the first direction (e.g., Y-axis direction) while being extended in the first direction (e.g., Y-axis direction).

In the transparent display panel 110 according to one embodiment of the present disclosure, a plurality of touch lines TL may be disposed in the first non-transmissive area NTA1 that is not a second non-transmissive area NTA2, whereby light transmittance may be prevented from being deteriorated due to the plurality of touch lines TL. The second non-transmissive area NTA2 extended in the second direction (e.g., X-axis direction) crosses between adjacent transmissive areas TA as shown in FIG. 3. When a width of the second non-transmissive area NTA2 crossing the transmissive areas TA is increased, a size of the transmissive area TA is necessarily reduced. When the plurality of touch lines TL are disposed in the second non-transmissive area NTA2, the width of the second non-transmissive area NTA2 is increased to dispose a large number of lines, and the size of the transmissive area TA is reduced. That is, a problem may occur in that light transmittance of the transparent display panel 110 is reduced due to the plurality of touch lines TL.

In the transparent display panel 110 according to one embodiment of the present disclosure, the plurality of touch lines TL are disposed in the first non-transmissive area NTA1, and only one touch bridge line TBL for connecting the plurality of touch sensors TS are provided in the second non-transmissive area NTA2. Therefore, the transparent display panel 110 according to one embodiment of the present disclosure may reduce or minimize the size decrease of the transmissive area TA or decrease in light transmittance due to the plurality of touch lines TL and the touch bridge line TBL.

The touch sensor TS may be provided in the transmissive area TA. The touch sensor TS may be disposed in each of the plurality of transmissive areas TA, and may be changed in capacitance during user contact. A touch driver (not shown) may be connected to the plurality of touch sensors TS through the plurality of touch lines TL to detect a change in capacitance of the plurality of touch sensors TS.

Hereinafter, a connection relation among a plurality of touch sensors TS, a plurality of touch lines TL and a plurality of touch bridge lines TBL will be described in more detail with reference to FIGS. 4 and 5.

Figure 4:
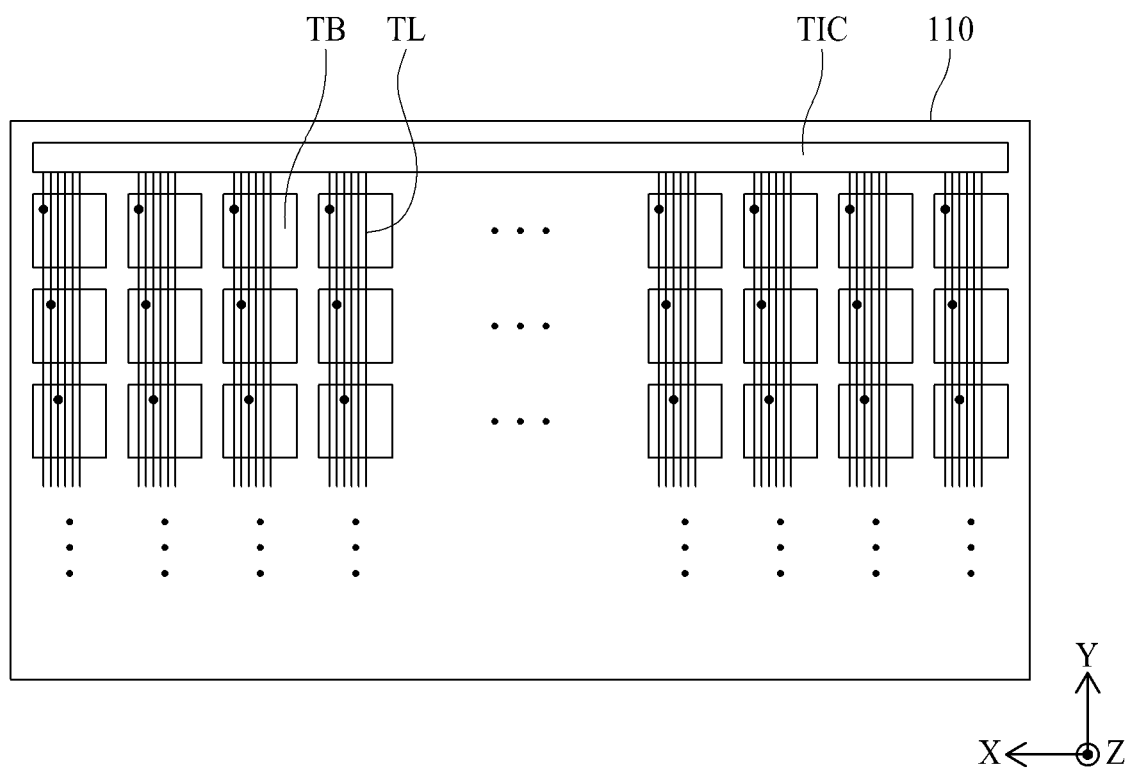
FIG. 4 is a view illustrating a connection relation between a plurality of touch blocks and a plurality of touch lines.
Figure 5:
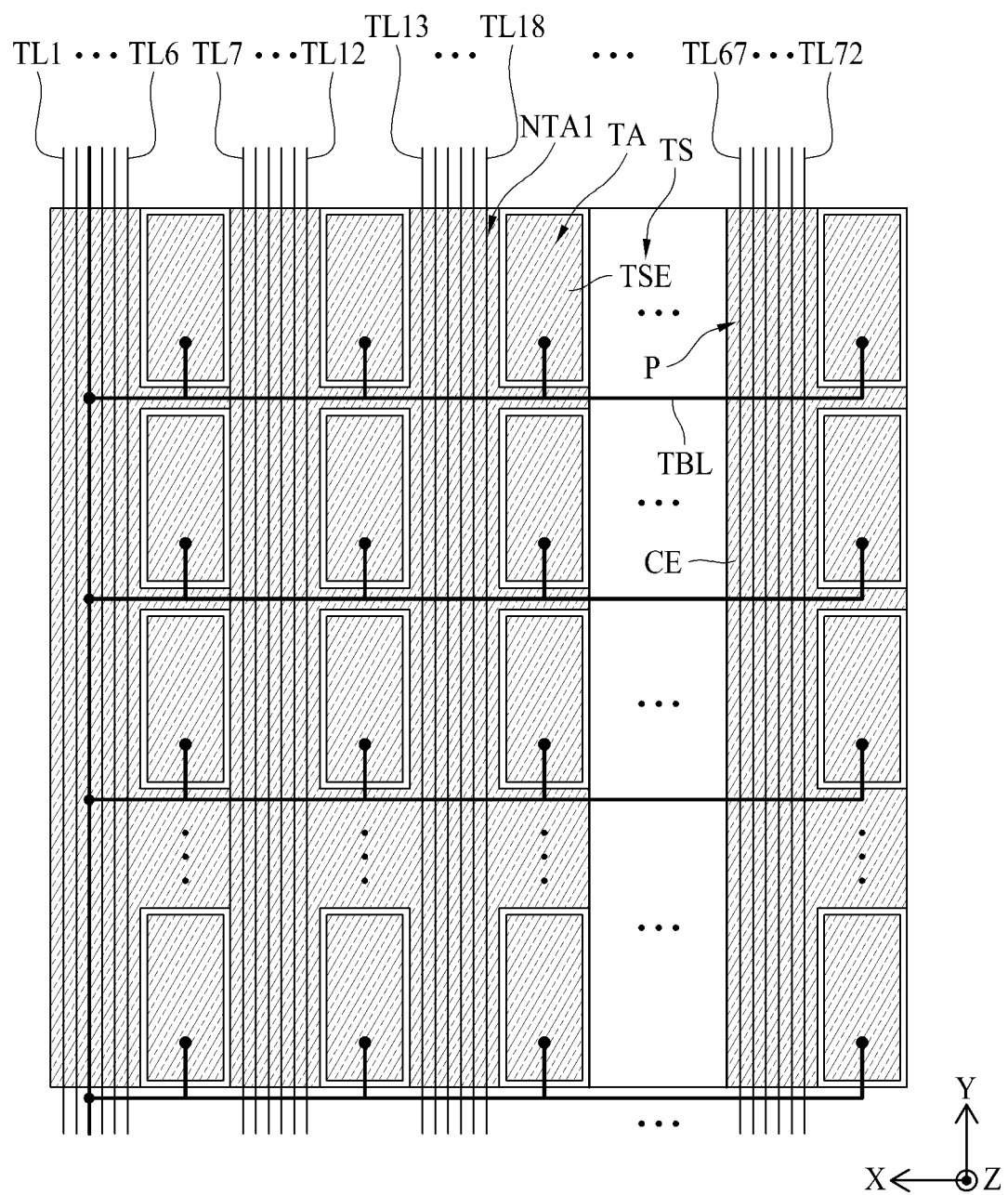
FIG. 5 is a view illustrating a connection relation between a plurality of touch lines and a plurality of touch sensors in one touch block.

FIG. 4 is a view illustrating a connection relation between a plurality of touch blocks and a plurality of touch lines, and FIG. 5 is a view illustrating a connection relation between a plurality of touch lines and a plurality of touch sensors in one touch block.

Referring to FIGS. 4 to 5, the transparent display panel 110 according to one embodiment of the present disclosure may include a plurality of touch blocks TB. Each of the plurality of touch blocks TB may include a plurality of pixels P and a plurality of transmissive areas TA disposed to correspond to the plurality of pixels P one-to-one as a basic unit for determining a user touch position. For example, each of the plurality of touch blocks TB may include 12×15 pixels P and 12×15 touch sensors TS. In this case, when image resolution is 1920×1080, touch resolution may be 160×72.

At this time, the touch sensor TS may include a touch sensor electrode TSE. The touch sensor electrode TSE may include the same material in the same layer as the cathode electrode CE of the pixel P. In this case, the touch sensor electrode TSE and the cathode electrode CE may be disposed to be spaced apart from each other.

In the transparent display panel 110 according to one embodiment of the present disclosure, as each of the plurality of touch lines TL is connected to one of the plurality of touch blocks TB, a change in capacitance of the touch sensors TS provided in the connected touch block TB may be sensed. That is, the plurality of touch lines TL provided in the transparent display panel 110 may correspond to the plurality of touch blocks TB one-to-one. Therefore, the number of touch lines TL may be the same as the number of touch blocks TB in the transparent display panel 110. For example, when the number of touch blocks TB is 160λ72, the touch line TL may also be 160λ72, and may be connected to the touch driver TIC.

As described above, in order to form the touch lines TL as much as the number of touch blocks TB, at least two touch lines TL should be provided in one first non-transmissive area NTA1. For example, when image resolution is 1920×1080 and touch resolution is 160×72, six touch lines TL1, TL2, TL3, TL4, TL5 and TL6 may be provided in one first non-transmissive area NTA1, as shown in FIG. 3, in order to form 160×72 touch lines TL in the transparent display panel 110. The plurality of touch sensors TS provided in one touch block TB may be connected to one of the plurality of touch lines TL provided in one touch block TB as shown in FIG. 5. For example, twelve first non-transmissive areas NTA1 may be provided in one touch block TB, and six touch lines TL1, TL2, TL3, TL4, TL5 and TL6 may be disposed in each of the twelve first non-transmissive areas NTA1. As a result, one touch block TB may be provided with 72 touch lines TL1, . . . , TL72. In this case, the plurality of touch sensors TS provided in one touch block TB may be connected to one specific touch line TL of the 72 touch lines TL1, TL72. At this time, the specific touch line TL may be connected to the plurality of touch sensors TS arranged in the second direction (e.g., X-axis direction) through the touch bridge lines TBL extended in the second direction (e.g., X-axis direction). As a result, the plurality of touch sensors TS provided in one touch block TB may be electrically connected through a specific touch line TL and the touch bridge lines TBL.

Each of the plurality of touch lines TL may correspond to touch blocks TB one-to-one. Therefore, the plurality of touch blocks TB are connected to different touch lines and thus may be electrically separated from each other. Each touch line TL may connect a plurality of touch sensors TS provided in a corresponding touch block TB to a touch driver TIC. In detail, each touch line TL may transmit the changed capacitance provided from the touch sensors TS provided in the touch block TB to the touch driver TIC. The touch driver TIC may sense the changed capacitance, and may determine a touch position of a user. Also, each touch line TL may provide the sensing voltage generated from the touch driver TIC to the touch sensors TS provided in the touch block TB.

Hereinafter, light emitting elements of a light emission area EA and the touch sensors TS of the transmissive area TA will be described in more detail with reference to FIGS. 6 to 7.

Figure 6:
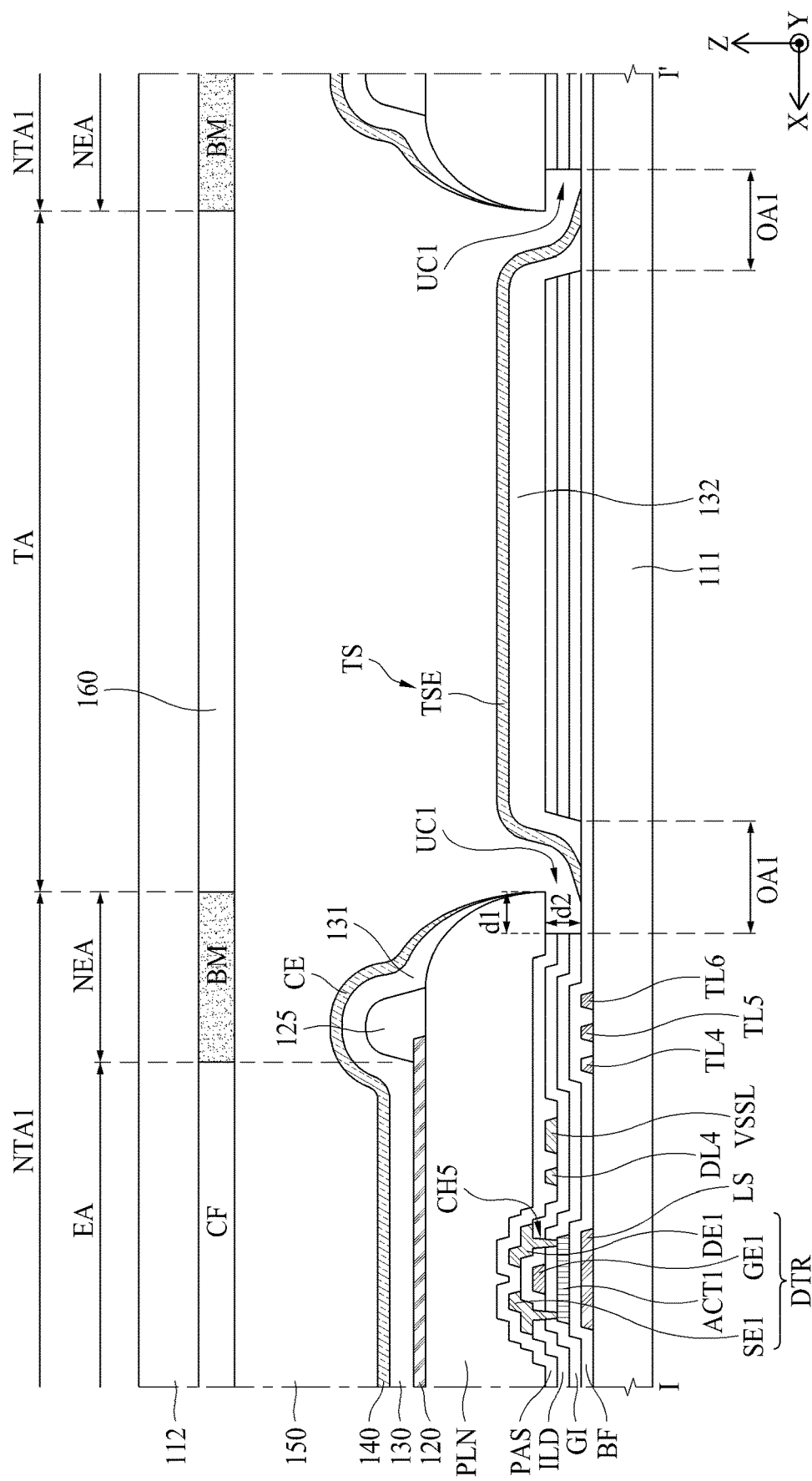
FIG. 6 is a cross-sectional view taken along line I-I' of FIG. 3.
Figure 7:
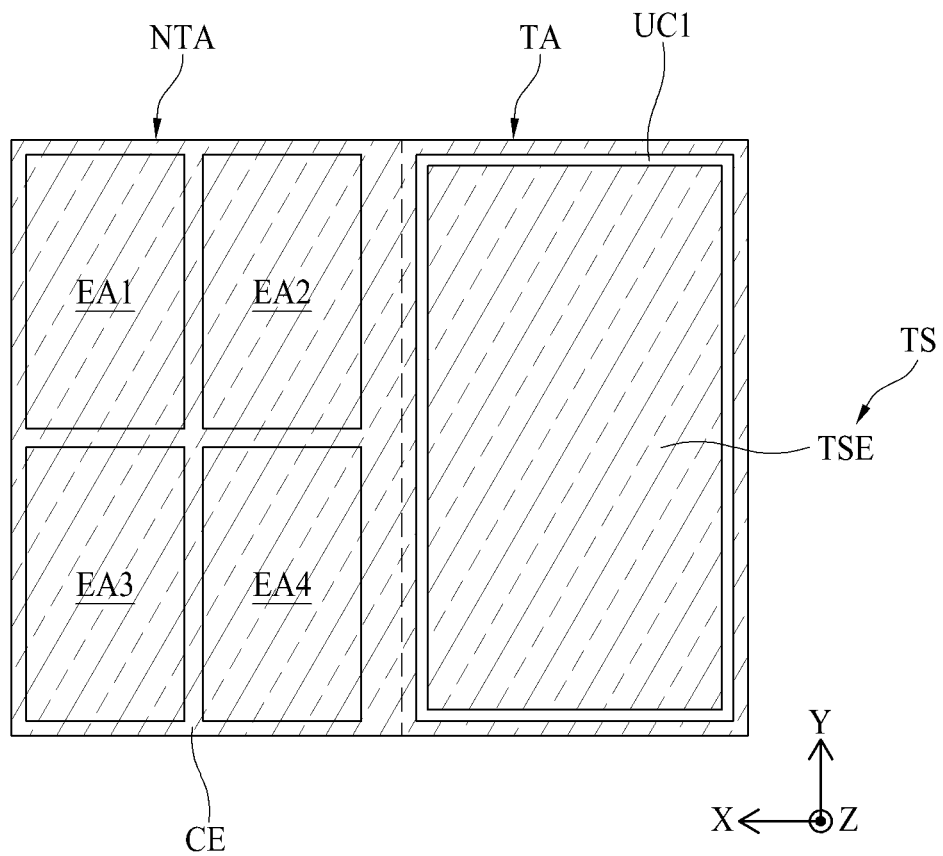
FIG. 7 is a view illustrating an example that a cathode electrode and a touch sensor electrode are disposed.
Figure 8:
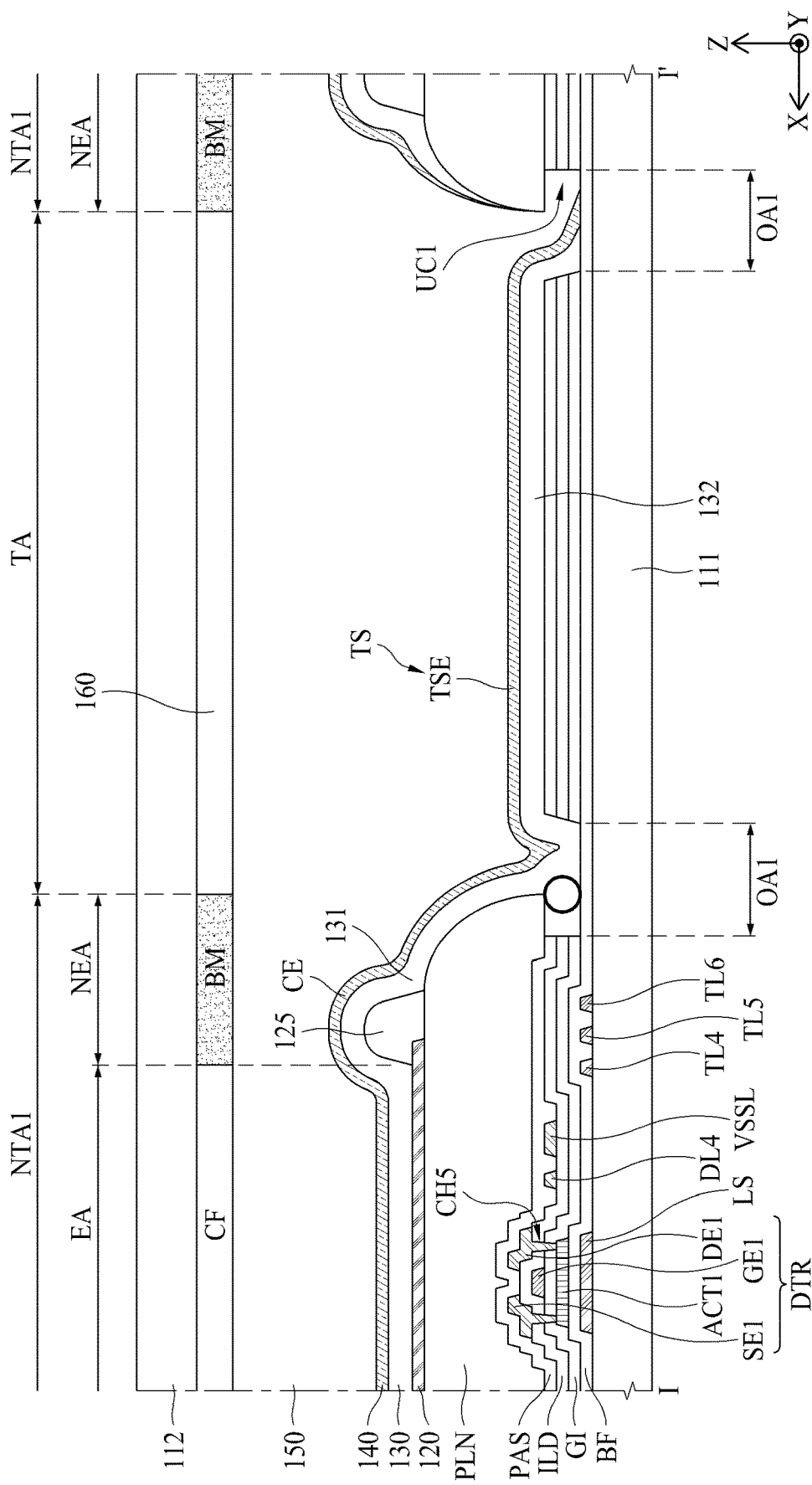
FIG. 8 is a view illustrating an example that a defective touch sensor occurs in a first undercut structure due to particles.

FIG. 6 is a cross-sectional view taken along line I-I' of FIG. 3, FIG. 7 is a view illustrating an example that a cathode electrode and a touch sensor electrode are disposed, and FIG. 8 is a view illustrating an example that a defective touch sensor occurs in a first undercut structure due to particles.

Referring to FIGS. 3 and 6 to 8, the first non-transmissive area NTA1 includes circuit areas CA1, CA2, CA3 and CA4 in which at least one transistor and a capacitor are disposed, and may be provided with a pixel power line VDDL, a common power line VSSL, a reference line REFL, data lines DL and touch lines TL, which are extended in the first direction (e.g., Y-axis direction) and disposed so as not to overlap the circuit areas CA1, CA2, CA3 and CA4. The second non-transmissive area NTA2 may be provided with a scan line SCANL, a touch bridge line TBL and a gate-on voltage line VGHL, which are extended in the second direction (e.g., X-axis direction).

At least one transistor may include a drive transistor DTR and switching transistors. The switching transistors may be switched in accordance with a scan signal supplied to the scan line SCANL to charge a data voltage supplied from the data line DL in the capacitor or supply a reference voltage to the driving transistor DTR.

The driving transistor DTR is switched in accordance with the data voltage charged in the capacitor to generate a data current from a power source supplied from the pixel power line VDDL and supply the data current to a first electrode 120 of the subpixels SP1, SP2, SP3 and SP4. The driving transistor DTR may include an active layer ACT1, a gate electrode GE1, a source electrode SE1, and a drain electrode DE1.

As shown in FIG. 6, a light shielding layer LS may be provided over the first substrate 111. The light shielding layer LS may serve to shield external light incident on an active layer ACT in an area in which a driving transistor DTR is provided. The light shielding layer LS may include a single layer or multi-layer made of any one of molybdenum (Mo), aluminum (Al), chromium (Cr), gold (Au), titanium (Ti), nickel (Ni), neodymium (Nd) and copper (Cu), or their alloy.

The transparent display panel 110 according to one embodiment of the present disclosure may form at least one of the pixel power line VDDL, the common power line VSSL, the reference line REFL, the data lines DL and the touch lines TL in the same layer as the light shielding layer LS. For example, the reference line REFL and the touch lines TL may include the same material as that of the light shielding layer LS and may be provided in the same layer as the light shielding layer LS, but are not limited thereto.

A buffer layer BF may be provided over the light shielding layer LS. The buffer layer BF is to protect the transistors DTR from water permeated through the first substrate 111 vulnerable to water permeation, and may include an inorganic layer, for example, a silicon oxide layer (SiOx), a silicon nitride layer (SiNx) or a multi-layer of the silicon oxide layer and the silicon nitride layer.

The active layer ACT1 of the driving transistor DTR may be provided over the buffer layer BF. The active layer ACT1 may include a silicon-based semiconductor material or an oxide-based semiconductor material.

A gate insulating layer GI may be provided over the active layer ACT1 of the driving transistor DTR. The gate insulating layer GI may be provided in the non-transmissive area NTA and the transmissive area TA. However, in order to form the first undercut structure UC1 in the transmissive area TA, the gate insulating layer GI may be provided with a first opening area OA1 that is provided to expose the buffer layer BF without being provided in at least a portion of the transmissive area TA. The gate insulating layer GI may include an inorganic layer, for example, a silicon oxide layer (SiOx), a silicon nitride layer (SiNx) or a multi-layer of the silicon oxide layer and the silicon nitride layer.

A gate electrode GE1 of the driving transistor DTR may be provided over the gate insulating layer GI. The gate electrode GE1 may include a single layer or multi-layer made of one of molybdenum (Mo), aluminum (Al), chromium (Cr), gold (Au), titanium (Ti), nickel (Ni), neodymium (Nd) and copper (Cu), or their alloy.

An interlayer dielectric layer ILD may be provided over the gate electrode GE1 of the driving transistor DTR. The interlayer dielectric layer ILD may be provided in the non-transmissive area NTA and the transmissive area TA. However, the interlayer dielectric layer ILD may be provided with a first opening area OA1, which exposes the buffer layer BF without being provided in at least a portion of the transmissive area TA, to form a first undercut structure UC1 in the transmissive area TA. The interlayer dielectric layer ILD may include an inorganic layer, for example, a silicon oxide layer (SiOx), a silicon nitride layer (SiNx) or a multi-layer of the silicon oxide layer and the silicon nitride layer.

A source electrode SE1 and a drain electrode DE1 of the driving transistor DTR may be provided over the interlayer dielectric layer ILD. The source electrode SE1 and the drain electrode DE1 of the driving transistor DTR may be connected to the active layer ACT1 of the driving transistor DTR through a fifth contact hole CH5 passing through the gate insulating layer GI and the interlayer dielectric layer ILD. The source electrode SE1 and the drain electrode DE1 of the driving transistor DTR may include a single layer or multi-layer made of one of molybdenum (Mo), aluminum (Al), chromium (Cr), gold (Au), titanium (Ti), nickel (Ni), neodymium (Nd) and copper (Cu), or their alloy.

In the transparent display panel 110 according to one embodiment of the present disclosure, at least one of the pixel power line VDDL, the common power line VSSL, the reference line REFL, the data lines DL and the touch lines TL may be provided in the same layer as the source electrode SE1 and the drain electrode DE1 of the driving transistor DTR. For example, the pixel power line VDDL, the common power line VSSL and the data lines DL may include the same material as that of the source electrode SE1 and the drain electrode DE1 in the same layer as the source electrode SE1 and the drain electrode DE1, but are not limited thereto.

A passivation layer PAS for insulating the driving transistor DTR may be provided over the source electrode SE1 and the drain electrode DE1 of the driving transistor DTR. The passivation layer PAS may be provided in the non-transmissive area NTA and the transmissive area TA. However, the passivation layer PAS may be provided with a first opening area OA1, which exposes the buffer layer BF without being provided in at least a portion of the transmissive area TA, to form the first undercut structure UC1 in the transmissive area TA. The first opening area OA1 of the passivation layer PAS may at least partially overlap the first opening area OA1 of the interlayer dielectric layer ILD and the first opening area OA1 of the gate insulating layer GI. The passivation layer PAS may include an inorganic layer, for example, a silicon oxide layer (SiOx), a silicon nitride layer (SiNx) or a multi-layer of the silicon oxide layer and the silicon nitride layer.

The planarization layer PLN may be provided over the passivation layer PAS to planarize a step difference due to the driving transistor DTR and the plurality of signal lines. The planarization layer PLN may be provided in the non-transmissive area NTA, and may not be provided in at least a portion of the transmissive area TA to form the first undercut structure UC1 in the transmissive area TA. The planarization layer PLN may include an organic layer such as an acrylic resin, an epoxy resin, a phenolic resin, a polyamide resin and a polyimide resin.

In the transparent display panel 110 according to one embodiment of the present disclosure, the first undercut structure UC1 may be formed using the planarization layer PLN and the plurality of inorganic insulating layers, for example, the passivation layer PAS, the interlayer dielectric layer ILD and the gate insulating layer GI. In detail, the first undercut structure UC1 may be formed in such a manner that the planarization layer PLN is more protruded than the plurality of inorganic insulating layers, for example, the passivation layer PAS, the interlayer dielectric layer ILD and the gate insulating layer GI in a direction of the transmissive area TA. Therefore, the first undercut structure UC1 may expose at least a portion of the lower surface of the planarization layer PLN, and the plurality of inorganic insulating layers may not be provided below the exposed lower surface so that a gap space with the buffer layer BF may be provided.

The first undercut structure UC1 may be formed through a wet etching process. The wet etching process for forming the first undercut structure UC1 may be isotropic etching in view of properties. Therefore, in the first undercut structure UC1, a first gap distance d1 from an end of the planarization layer PLN to an end of the plurality of inorganic insulating layers may be formed in the same manner as a second gap distance d2 from the lower surface of the planarization layer PLN to the upper surface of the buffer layer BF. At this time, the first gap distance d1 of the first undercut structure UC1 should have a minimum or selected distance value, for example, 2 um or more in order to make sure of isolation between the cathode electrode CE and the touch sensor electrode TSE. Therefore, since the second gap distance d2 of the first undercut structure UC1 should be greater than or equal to 2 um, a sum of thicknesses of the passivation layer PAS, the interlayer dielectric layer ILD and the gate insulating layer GI may be 2 um or more.

The first undercut structure UC1 is provided in the transmissive area TA, and may have a planar closed shape. For example, the first undercut structure UC1 may be provided along an edge of the transmissive area TA. At this time, the first undercut structure UC1 may be provided to surround the touch sensor TS.

In the transparent display panel 110 according to one embodiment of the present disclosure, the first undercut structure UC1 may be formed using the planarization layer PLN and the plurality of inorganic insulating layers, whereby light transmittance may be prevented from being reduced due to the first undercut structure UC1.

A light emitting element, which includes a first electrode 120, an organic light emitting layer 130 and a second electrode 140, and a bank 125 may be provided over the planarization layer PLN.

The first electrode 120 may be provided over the planarization layer PLN for each of the subpixels SP1, SP2, SP3 and SP4. The first electrode 120 is not provided in the transmissive area TA. The first electrode 120 may be connected to the driving transistor DTR. In detail, the first electrode 120 may be connected to one of the source electrode SE1 and the drain electrode DE1 of the driving transistor DTR through a contact hole (not shown) that passes through the planarization layer PLN and the passivation layer PAS.

The first electrode 120 may include a metal material having high reflectance, such as a stacked structure (Ti/Al/Ti) of aluminum and titanium, a stacked structure (ITO/Al/ITO) of aluminum and ITO, an Ag alloy, a stacked structure (ITO/Ag alloy/ITO) of Ag alloy and ITO, a MoTi alloy, and a stacked structure (ITO/MoTi alloy/ITO) of MoTi alloy and ITO. The Ag alloy may be an alloy of silver (Ag), palladium (Pd), copper (Cu), etc. The MoTi alloy may be an alloy of molybdenum (Mo) and titanium (Ti). The first electrode 120 may be an anode electrode of the light emitting element.

The bank 125 may be provided over the planarization layer PLN. The bank 125 may be provided to at least partially cover an edge of the first electrode 120 and expose a portion of the first electrode 120. Therefore, the bank 125 may prevent a problem in which light emitting efficiency is deteriorated due to concentration of a current on an end of the first electrode 120.

The bank 125 may be adjacent to light emission areas EA1, EA2, EA3 and EA4 of the subpixels SP1, SP2, SP3 and SP4. The light emission areas EA1, EA2, EA3 and EA4 of each of the subpixels SP1, SP2, SP3 and SP4 represent an area in which the first electrode 120, the organic light emitting layer 130 and the cathode electrode CE are sequentially stacked and holes from the first electrode 120 and electrons from the cathode electrode CE are combined with each other in the organic light emitting layer 130 to emit light. In this case, the area in which the bank 125 is provided may become the non-light emission area NEA because light is not emitted therefrom, and the area in which the bank 125 is not provided and the first electrode is exposed may become the light emission area EA.

The bank 125 may include an organic layer such as an acrylic resin, an epoxy resin, a phenolic resin, a polyamide resin, and a polyimide resin.

The organic light emitting layer 130 may be disposed over the first electrode 120. The organic light emitting layer 130 may include a hole transporting layer, a light emitting layer and an electron transporting layer. In this case, when a voltage is applied to the first electrode 120 and the cathode electrode CE, holes and electrons move to the light emitting layer through the hole transporting layer and the electron transporting layer, respectively and are combined with each other in the light emitting layer to emit light.

In one embodiment, the organic light emitting layer 130 may be a common layer commonly provided in the subpixels SP1, SP2, SP3 and SP4. In this case, the light emitting layer may be a white light emitting layer for emitting white light.

In another embodiment, the light emitting layer of the organic light emitting layer 130 may be provided for each of the subpixels SP1, SP2, SP3 and SP4. For example, a green light emitting layer for emitting green light may be provided in the first subpixel SP1, a red light emitting layer for emitting red light may be provided in the second subpixel SP2, a blue light emitting layer for emitting blue light may be provided in the third subpixel SP3, and a white light emitting layer for emitting white light may be provided in the fourth subpixel SP4. In this case, the light emitting layer of the organic light emitting layer 130 is not provided in the transmissive area TA.

An organic light emitting layer 130 may be separated from the non-transmissive area NTA and the transmissive area TA by the first undercut structure UC1. In detail, the organic light emitting layer 130 may be separated from an organic light emitting layer 131 provided in the non-transmissive area NTA and an organic light emitting layer 132 provided in the transmissive area TA by the first undercut structure UC1. That is, the organic light emitting layer 131 provided in the non-transmissive area NTA and the organic light emitting layer 132 provided in the transmissive area TA may be spaced apart from each other by the first undercut structure UC1.

A second electrode 140 may be disposed over the organic light emitting layer 130 and the bank 125. When the second electrode 140 is deposited on an entire surface, the second electrode 140 may be separated without being continuous between the non-transmissive area NTA and the transmissive area TA by the first undercut structure UC1. In detail, the second electrode 140 may be separated into a second electrode CE provided in the non-transmissive area NTA and a second electrode TSE provided in the transmissive area TA by the first undercut structure UC1.

In this case, the second electrode CE provided in the non-transmissive area NTA may be a cathode electrode CE, and is an element constituting a light emitting element. The cathode electrode CE may be connected to a cathode contact portion CCT to receive a power source from the common power line VSSL. The cathode electrode CE may be a common layer that is commonly provided in the subpixels SP1, SP2, SP3 and SP4 to apply the same voltage.

Also, the second electrode TSE provided in the transmissive area TA is a touch sensor electrode TSE, and may be an element constituting the touch sensor TS. The touch sensor electrode TSE may be connected to a second touch contact electrode TCT2 to provide a change in capacitance to the touch line TL.

The second electrode 140, which includes the cathode electrode CE and the touch sensor electrode TSE, may include a transparent conductive material (TCO) such as ITO and IZO, which may transmit light, or a semi-transmissive conductive material such as magnesium (Mg), silver (Ag) or an alloy of magnesium (Mg) and silver (Ag). When the second electrode 140 includes a semi-transmissive conductive material, light emitting efficiency may be increased by a micro cavity.

An encapsulation layer 150 may be provided over the light emitting elements and the touch sensors TS. The encapsulation layer 150 may be provided over the cathode electrode CE and the touch sensor electrode TSE to at least partially cover the cathode electrode CE and the touch sensor electrode TSE. The encapsulation layer 150 serves to prevent oxygen or water from being permeated into the organic light emitting layer 130, the cathode electrode CE and the touch sensor electrode TSE. To this end, the encapsulation layer 150 may include at least one inorganic layer and at least one organic layer.

A color filter CF may be provided over the encapsulation layer 150. The color filter CF may be provided over one surface of the second substrate 112 that faces the first substrate 111. In this case, the first substrate 111 provided with the encapsulation layer 150 and the second substrate 112 provided with the color filter CF may be bonded to each other by an adhesive layer 160. At this time, the adhesive layer 160 may be an optically clear resin (OCR) layer or an optically clear adhesive (OCA) film.

The color filter CF may be provided to be patterned for each of the subpixels SP1, SP2, SP3 and SP4. A black matrix BM may be provided between color filters CF. The black matrix BM may be disposed between the subpixels SP1, SP2, SP3 and SP4 to prevent a color mixture from occurring between adjacent subpixels SP1, SP2, SP3 and SP4. In addition, the black matrix BM may prevent light incident from the outside from being reflected by the plurality of lines, for example, the scan lines SCANL, the pixel power line VDDL, the common power line VSSL, the reference line REFL, data lines DL, etc., provided between the subpixels SP1, SP2, SP3 and SP4.

In the transparent display panel 110 according to one embodiment of the present disclosure, the touch sensor electrode TSE of the touch sensor TS and the cathode electrode CE of the light emitting element may be formed in the same layer using a first undercut structure UC1. In the transparent display panel 110 according to one embodiment of the present disclosure, a touch process is simplified, and a separate mask for the touch sensor electrode TSE is not required.

Also, in the transparent display panel 110 according to one embodiment of the present disclosure, the first undercut structure UC1 may be formed using the planarization layer PLN and the plurality of inorganic insulating layers, whereby the first undercut structure UC1 may be formed without loss of light transmittance.

Also, in the transparent display panel 110 according to one embodiment of the present disclosure, the touch lines TL may be disposed below the light emitting element, whereby light emitting efficiency of the pixel P may be prevented from being deteriorated due to the touch lines TL.

Also, in the transparent display panel 110 according to one embodiment of the present disclosure, the touch lines TL may be disposed so as not to overlap the circuit areas CA1, CA2, CA3 and CA4, whereby influence caused by the circuit element may be minimized or reduced and at the same time uniformity of parasitic capacitance may be improved.

Also, in the transparent display panel 110 according to one embodiment of the present disclosure, the plurality of touch lines TL may be disposed in the first non-transmissive area NTA1, and only one touch bridge line TBL for connecting the plurality of touch sensors TS may be provided in the second non-transmissive area NTA2, whereby decrease in a size of the transmissive area TA or decrease in light transmittance due to the plurality of touch lines TL and the touch bridge line TBL may be minimized or reduced.

As described above, in the transparent display panel 110 according to one embodiment of the present disclosure, the touch sensor electrode TSE of the touch sensor TS and the cathode electrode CE of the light emitting element may be separated from each other by the first undercut structure UC1. However, in the manufacturing process, particles P may occur in the first undercut structure UC1 as shown in FIG. 8. In this case, the touch sensor electrode TSE of the touch sensor TS and the cathode electrode CE of the light emitting element may be electrically connected to each other without being separated from each other.

Since all of the touch sensors TS included in one touch block TB are electrically connected to one another, all the touch sensors TS included in the corresponding touch block TB are not normally operated even though a defect occurs only in one of the touch sensors TS. Therefore, as shown in FIG. 8, when the touch sensor electrode TSE of the touch sensor TS and the cathode electrode CE of the light emitting element are connected to each other to generate a defective touch sensor TS, a touch of a user is not sensed in the entire touch block TB in which the defective touch sensor TS is included.

The transparent display panel 110 according to one embodiment of the present disclosure may include an element capable of detecting the defective touch sensor TS when the defective touch sensor TS occurs. In the transparent display panel 110 according to one embodiment of the present disclosure, the detected defective touch sensors TS and the touch bridge line TBL may be electrically separated from each other through a repair process. In detail, the transparent display panel 110 according to one embodiment of the present disclosure may further include a touch transistor TTR for connecting the touch sensor TS with a reference line REFL, and a touch connection portion TC for connecting the touch sensor TS with the touch bridge line TBL, and may detect the defective touch sensor TS by using the touch transistor TTR and the touch connection portion TC. Also, in the transparent display panel 110 according to one embodiment of the present disclosure, when the defective touch sensor TS is detected, the touch connection portion TC for connecting the defective touch sensor TS with the touch bridge line TBL may be cut by a laser, so that the defective touch sensor TS and the touch bridge line TBL may be electrically separated from each other. As a result, the other touch sensors TS of the corresponding touch block TB may be normally operated.

Hereinafter, the touch transistor TTR and the touch connection portion TC will be described in detail with reference to FIGS. 9 to 15.

Figure 9:
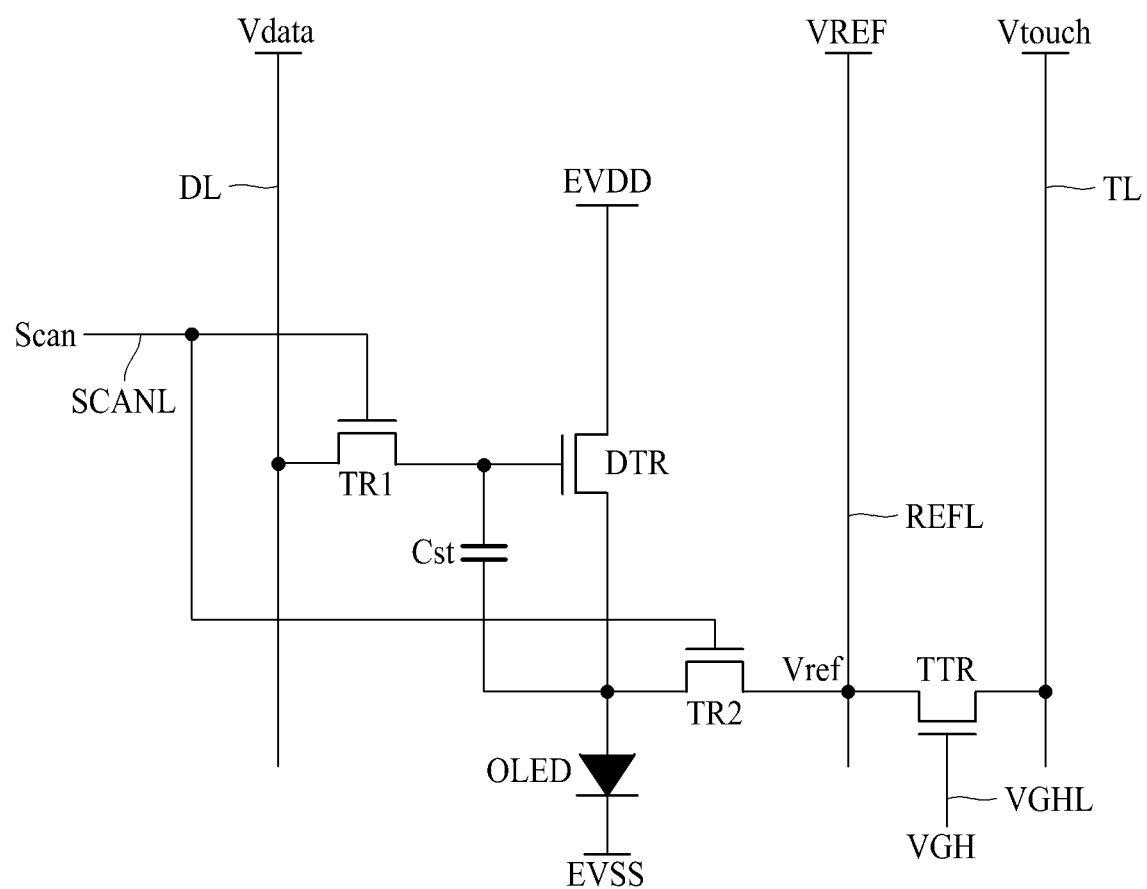
FIG. 9 is a circuit view illustrating an example of a pixel circuit.
Figure 10:
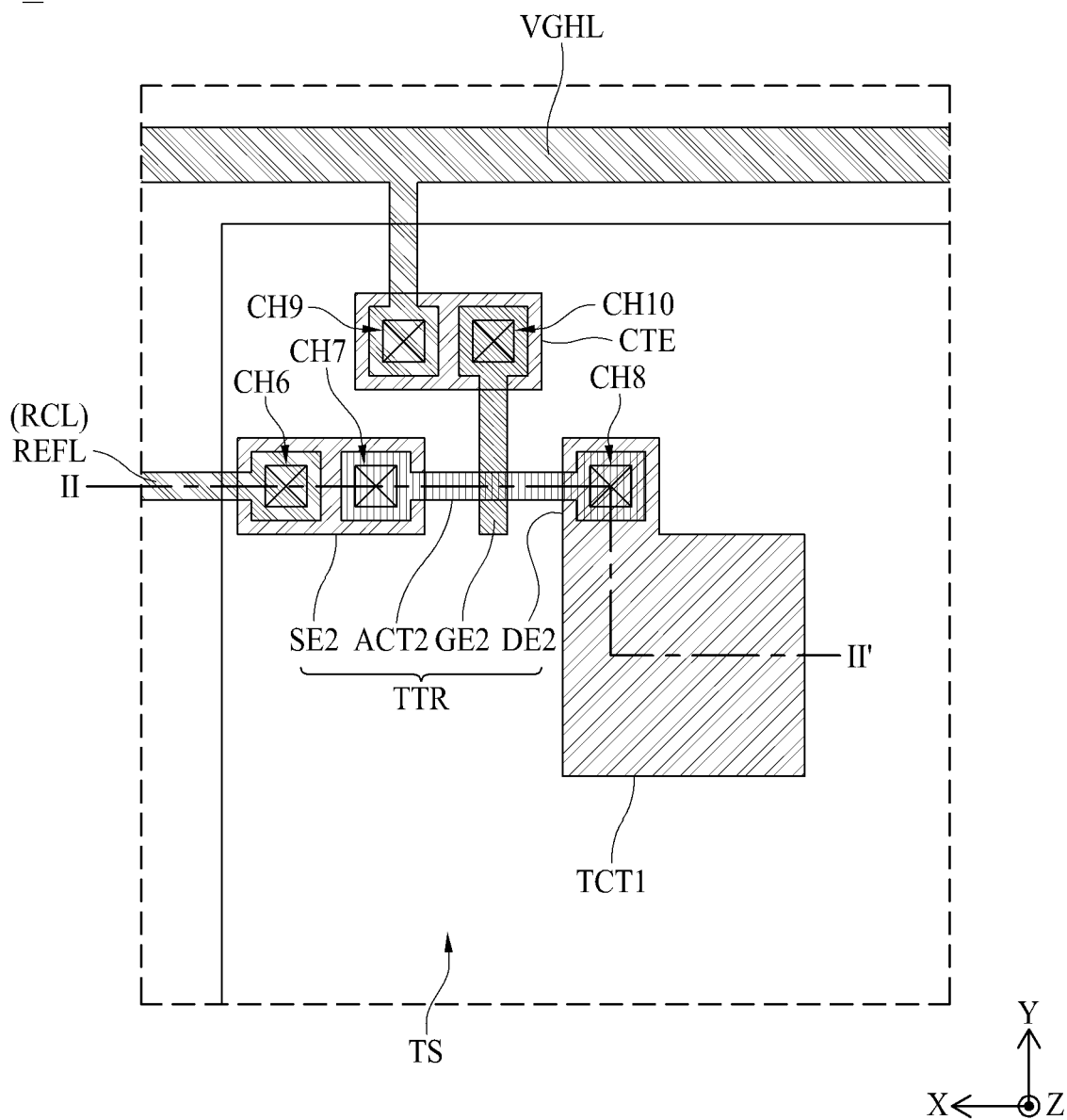
FIG. 10 is an enlarged view illustrating an area C of FIG. 3.
Figure 11:
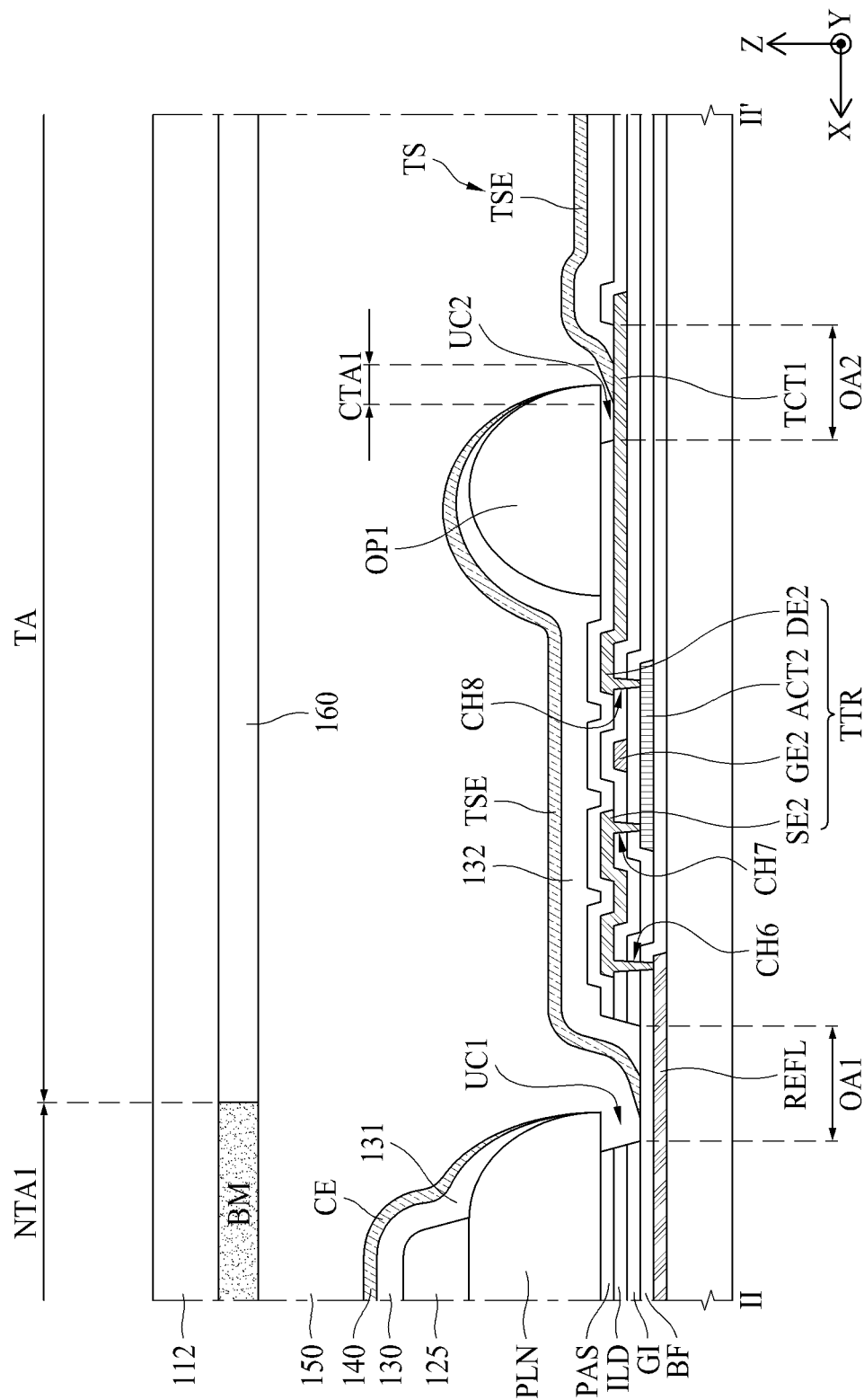
FIG. 11 is a cross-sectional view an example of line II-IF of FIG. 10.
Figure 12:
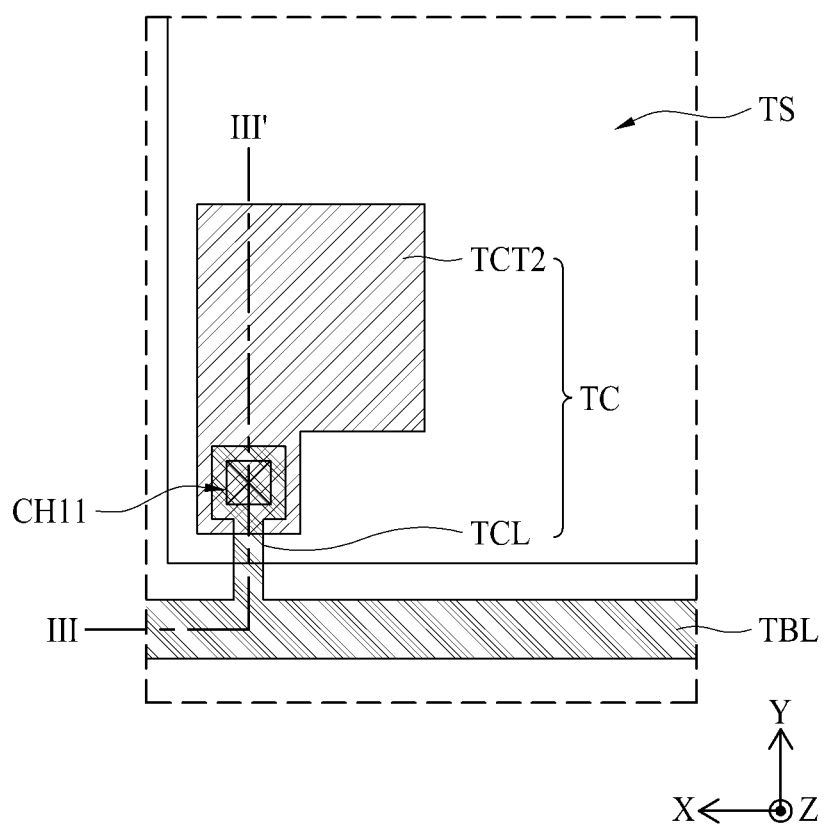
FIG. 12 is an enlarged view illustrating an area D of FIG. 3.
Figure 13:
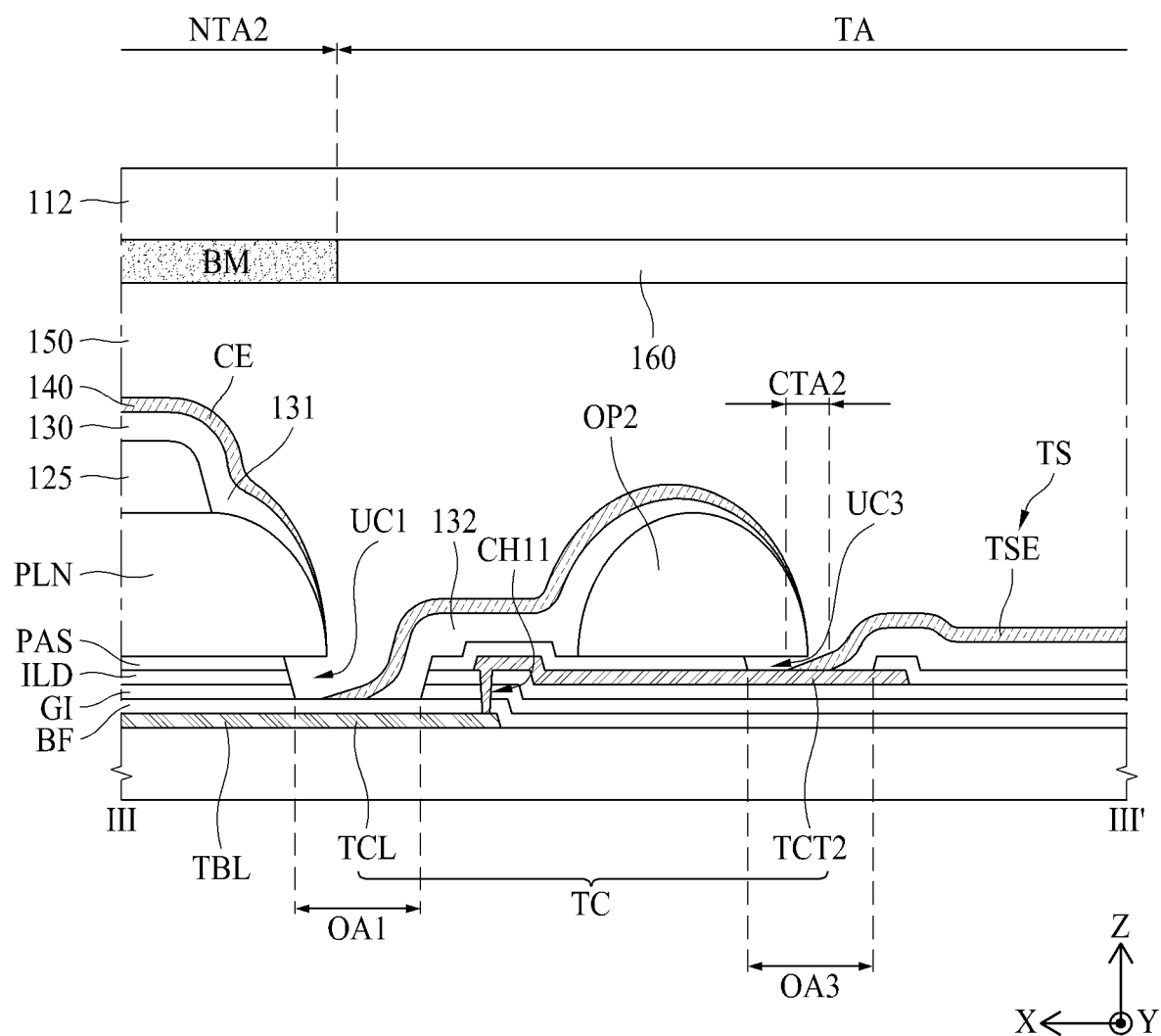
FIG. 13 is a cross-sectional view an example of line of FIG. 12.
Figure 14:
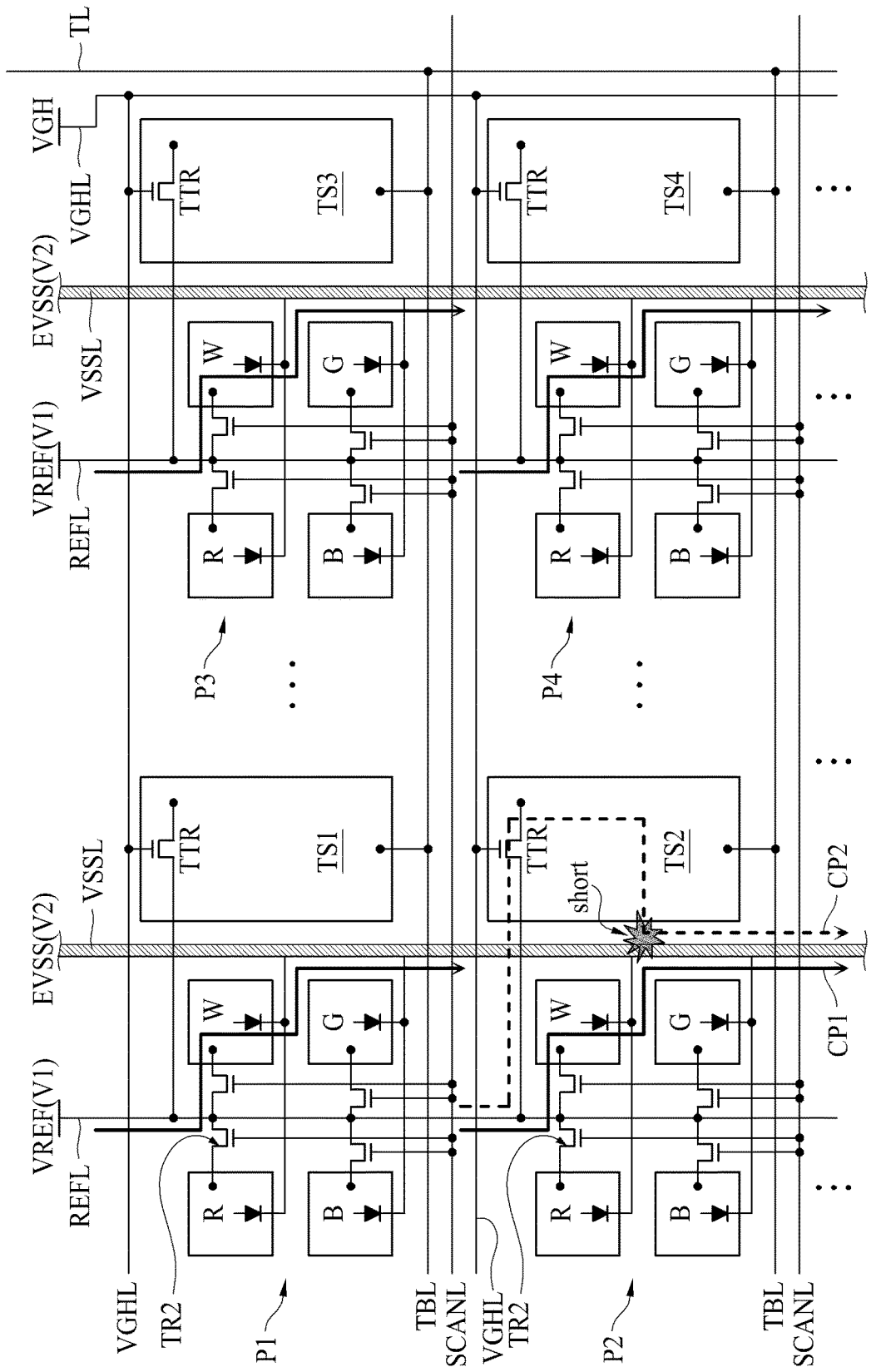
FIG. 14 is a view illustrating a current path in a defective touch sensor.
Figure 15:
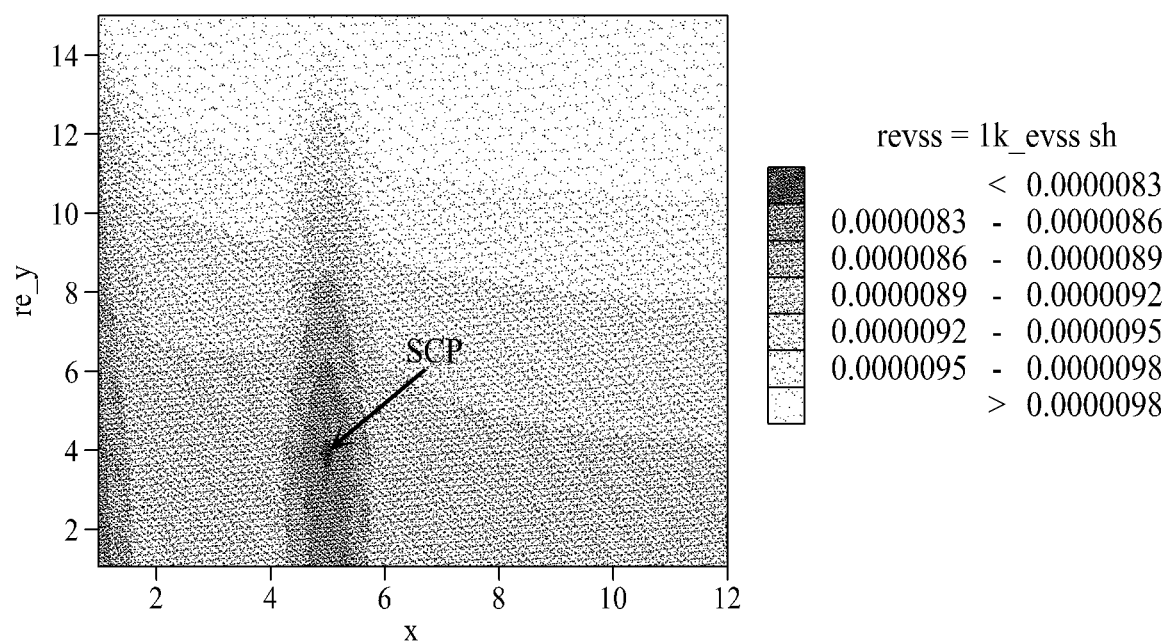
FIG. 15 is a view illustrating a voltage difference between a normal touch sensor and a defective touch sensor.

FIG. 9 is a circuit view illustrating an example of a pixel circuit, FIG. 10 is an enlarged view illustrating an area C of FIG. 3, FIG. 11 is a cross-sectional view an example of line II-IP of FIG. 10, FIG. 12 is an enlarged view illustrating an area D of FIG. 3, FIG. 13 is a cross-sectional view an example of line of FIG. 12, FIG. 14 is a view illustrating a current path in a defective touch sensor, and FIG. 15 is a view illustrating a voltage difference between a normal touch sensor and a defective touch sensor.

As shown in FIG. 9, the transparent display panel 110 according to one embodiment of the present disclosure may include a circuit element that includes first and second switching transistors TR1 and TR2, a driving transistor DTR, a capacitor Cst, a light emitting element OLED and a touch transistor TTR. At this time, the first and second switching transistors TR1 and TR2, the driving transistor DTR, the capacitor Cst and the light emitting element OLED may be provided for each of subpixels SP1, SP2, SP3 and SP4.

The first switching transistor TR1 charges the data voltage Vdata supplied from the data line DL in the capacitor Cst. In detail, a gate electrode of the first switching transistor TR1 may be connected to the scan line SCANL and its first electrode may be connected to the data line DL. In addition, a second electrode of the first switching transistor TR1 may be connected to one end of the capacitor Cst and a gate electrode GE of the driving transistor DTR. The first switching transistor TR1 may be turned on in response to the scan signal Scan applied through the scan line SCANL. When the first switching transistor TR1 is turned on, the data voltage Vdata applied through the data line DL may be transferred to one end of the capacitor Cst.

A gate electrode of the second switching transistor TR2 may be connected to the scan line SCANL, and its first electrode may be connected to the reference line REFL. In addition, a second electrode of the second switching transistor TR2 may be connected to the source electrode of the driving transistor DTR and the other end of the capacitor Cst.

The reference line REFL may be connected to a reference voltage source VREF and thus initialized to a reference voltage Vref. The second switching transistor TR2 may be turned on in response to the scan signal Scan applied through the scan line SCANL. When the second switching transistor TR2 is turned on, the reference voltage Vref applied through the reference line REFL may be transferred to the other end of the capacitor Cst. Also, the reference voltage Vref may be applied to the source electrode of the driving transistor DTR.

The driving transistor DTR generates a data current from a first power source EVDD supplied from the pixel power line VDDL and supplies the data current to the first electrode 120 of the subpixels SP1, SP2, SP3 and SP4. In detail, the gate electrode of the driving transistor DTR may be connected to one end of the capacitor Cst, and its drain electrode may be connected to the pixel power line VDDL. Further, the source electrode of the driving transistor DTR may be connected to an anode electrode of the light emitting element OLED.

The driving transistor DTR may be turned on in accordance with the data voltage charged in the capacitor Cst. When the driving transistor DTR is turned on, the first power source EVDD applied through the pixel power line VDDL may be transferred to the anode electrode of the light emitting element OLED.

The anode electrode of the light emitting element OLED may be connected to the source electrode of the driving transistor DTR, and its cathode electrode may be connected to the common power line VSSL. The light emitting element OLED may emit light in response to the driving current generated by the driving transistor DTR.

A gate electrode of the touch transistor TTR may be connected to the gate-on voltage line VGHL, and its first electrode may be connected to the reference line REFL. Also, a second electrode of the touch transistor TTR may be connected to the touch sensor electrode TSE of the touch sensor TS. The touch transistor TTR may be turned on in response to a gate-on voltage applied through the gate-on voltage line VGHL. When the touch transistor TTR is turned on, the touch sensor electrode TSE and the reference line REFL may be connected to each other.

The first and second switching transistors TR1 and TR2, the driving transistor DTR, the capacitor Cst and the light emitting element OLED may be disposed in each of the circuit areas CA1, CA2, CA3 and CA4 of the first non-transmissive area NTA1. As shown in FIGS. 3 and 10, the touch transistor TTR may be provided to at least partially overlap the touch sensor TS.

In more detail, each of the plurality of touch sensors TS may be connected to the reference line REFL through the touch transistor TTR. The touch transistor TTR may include an active layer ACT2, a gate electrode GE2, a source electrode SE2 and a drain electrode DE2. In FIG. 10, the active layer ACT2, the gate electrode GE2, the source electrode SE2 and the drain electrode DE2 of the touch transistor TTR are disposed to at least partially overlap the touch sensor electrode TSE, but are not limited thereto. In another embodiment, at least a portion of the drain electrode DE2 and the active layer ACT2 of the touch transistor TTR may overlap the touch sensor electrode TSE, and the gate electrode GE2 and the source electrode SE2 of the touch transistor TTR may not overlap the touch sensor electrode TSE.

The gate electrode GE2 of the touch transistor TTR may be connected to the gate-on voltage line VGHL. In detail, the gate electrode GE2 of the touch transistor TTR may be connected to the gate-on voltage line VGHL through a connection electrode CTE. One end of the connection electrode CTE may be connected to gate-on voltage line VGHL through a ninth contact hole CH9, and the other end thereof may be connected to the gate electrode GE2 through a tenth contact hole CH10.

The active layer ACT2 of the touch transistor TTR may be provided below the gate electrode GE2 to at least partially overlap the gate electrode GE2. One end of the active layer ACT2 may be connected to the source electrode SE2 through a seventh contact hole CH7, and the other end thereof may be connected to the drain electrode DE2 through an eighth contact hole CH8.

One end of the source electrode SE2 of the touch transistor TTR may be connected to the reference line REFL through a sixth contact hole CH6, and the other end thereof may be connected to the active layer ACT2 through the seventh contact hole CH7. One end of the drain electrode DE2 of the touch transistor TTR may be connected to the active layer ACT2 through the eighth contact hole CH8, and may be in contact with a first touch contact electrode TCT1 at the other end. The drain electrode DE2 of the touch transistor TTR and the first touch contact electrode TCT1 may be integrally formed.

The first touch contact electrode TCT1 may be provided in the transmissive area TA. The first touch contact electrode TCT1 may be disposed between the drain electrode DE2 of the touch transistor TTR and the touch sensor electrode TSE to electrically connect the drain electrode DE2 with the touch sensor electrode TSE.

In addition, a portion of an upper surface of the first touch contact electrode TCT1 may be exposed by a second undercut structure UC2, and the touch sensor electrode TSE may be connected to the exposed upper surface. In detail, the first touch contact electrode TCT1 may be formed in a layer provided between the buffer layer BF and the passivation layer PAS. In one embodiment, the first touch contact electrode TCT1 may be disposed between the interlayer dielectric layer ILD and the passivation layer PAS. In this case, the passivation layer PAS may be provided with a second opening area OA2 that is formed to expose at least a portion of the upper surface of the first touch contact electrode TCT1. The second undercut structure UC2 may be formed such that a first organic pattern OP1 provided on the passivation layer PAS in the transmission area TA is more protruded than the passivation layer PAS in the second opening area OA2. The first organic pattern OP1 may be formed of the same material as the planarization layer PLN and may overlap at least part of the second opening area OA2 of the passivation layer PAS. Therefore, the second undercut structure UC2 may expose at least a portion of the lower surface of the first organic pattern OP1, and may expose at least a portion of the upper surface of the first touch contact electrode TCT1 without having the passivation layer PAS below the exposed lower surface of the first organic pattern OP1. The second undercut structure UC2 may be provided inside the area where the first undercut structure UC1 is formed. That is, the second undercut structure UC2 may be disposed in the area in which the touch sensor TS is provided.

The touch sensor electrode TSE may be deposited on the exposed upper surface of the first touch contact electrode TCT1 to form a first contact area CTA1, and may be electrically connected to the first touch contact electrode TCT1.

Each of the plurality of touch sensors TS may be connected to the touch bridge line TBL through the touch connection portion TC as shown in FIGS. 3, 12 and 13. The touch connection portion TC may at least partially overlap the touch sensor TS at one end, and may at least partially overlap the touch bridge line TBL at the other end to connect the touch sensor TS with the touch bridge line TBL. The touch connection portion TC may include a touch connection line TCL and a second touch contact electrode TCT2.

The touch connection line TCL may connect the touch bridge line TBL with the touch sensor TS. In detail, one end of the touch connection line TCL may be connected to the touch bridge line TBL, and the other end thereof may be connected to the second touch contact electrode TCT2 through an eleventh contact hole CH11, and may be electrically connected to the touch sensor TS through the second touch contact electrode TCT2.

The touch connection line TCL may be formed in a layer provided between the first substrate 111 and the driving transistor DTR. In one embodiment, the touch connection line TCL may be formed of the same material as that of the light shielding layer LS in the same layer as the light shielding layer LS. The touch connection line TCL may be extended across the first undercut structure UC1. The first undercut structure UC1 may be formed through a wet etching process. In the transparent display panel 110 according to one embodiment of the present disclosure, the touch connection line TCL may be formed in the same layer as the light shielding layer LS so that the touch connection line TCL may be prevented from being lost in the wet etching process for forming the first undercut structure UC1.

The second touch contact electrode TCT2 may be provided in the transmissive area TA. The second touch contact electrode TCT2 may be disposed between the touch connection line TCL and the touch sensor electrode TSE to electrically connect the touch connection line TCL with the touch sensor electrode TSE. The second touch contact electrode TCT2 may be connected to the touch connection line TCL through the eleventh contact hole CH11.

Also, at least a portion of an upper surface of the second touch contact electrode TCT2 may be exposed by a third undercut structure UC3, and the touch sensor electrode TSE may be connected to the exposed upper surface. In detail, the second touch contact electrode TCT2 may be formed in a layer provided between the buffer layer BF and the passivation layer PAS. In one embodiment, the second touch contact electrode TCT2 may be provided between the interlayer dielectric layer ILD and the passivation layer PAS. In this case, the passivation layer PAS may be provided with a third opening area OA3 that is formed to expose at least a portion of the upper surface of the second touch contact electrode TCT2. The third undercut structure UC3 may be formed in such a manner that a second organic pattern OP2 provided on the passivation layer PAS in the transmission area TA is more protruded than the passivation layer PAS in the third opening area OA3. The second organic pattern OP2 may be formed of the same material as the planarization layer PLN and may overlap at least part of the third opening area OA3 of the passivation layer PAS. Therefore, the third undercut structure UC3 may expose at least a portion of the lower surface of the second organic pattern OP2, and may expose at least a portion of the upper surface of the second touch contact electrode TCT2 without having the passivation layer PAS below the exposed lower surface of the second organic pattern OP2. The third undercut structure UC3 may be provided inside the area in which the first undercut structure UC1 is formed. That is, the third undercut structure UC3 may be disposed in the area in which the touch sensor TS is provided.

The touch sensor electrode TSE may be deposited on the exposed upper surface of the second touch contact electrode TCT2 to form a second contact area CTA2, and may be electrically connected to the second touch contact electrode TCT2. The second touch contact electrode TCT2 may transfer a change in capacitance of the touch sensor electrode TSE to the touch line TL through the touch connection line TCL and the touch bridge line TBL.

The transparent display panel 110 according to one embodiment of the present disclosure may easily detect a defective touch sensor in units of pixels by using the touch transistor TTR. In detail, as described above, particles P may occur in the first undercut structure UC1, and the touch sensor electrode TSE of the touch sensor TS and the cathode electrode CE of the light emitting element may be electrically connected to each other without being separated from each other. In the defective touch sensor TS, when respective voltages different from each other are applied to the common power line VSSL and the reference line REFL, a current flows from the touch sensor electrode TSE to the cathode electrode CE.

For example, a first voltage V1, e.g., 20V, may be applied to the reference line REFL, and a second voltage, e.g., 0V, may be applied to the common power line VSSL. A gate-on voltage may be applied to the gate-on voltage line VGHL, so that the plurality of touch transistors TTR may be turned on. The scan signal may be applied to the scan line SCANL to turn on the plurality of second switching transistors TR2.

In this case, the plurality of pixels P1, P2, P3 and P4 disposed to correspond to the touch sensors TS1, TS2, TS3 and TS4 generate a current from the reference line REFL to the common power line VSSL, whereby the plurality of pixels P1, P2, P3 and P4 may emit light of a predetermined or selected color.

At this time, the current flowing from the reference line REFL to the common power line VSSL may include a first current flowing from the reference line REFL to the light emitting elements R, G, B and W by passing through the second switching transistor TR2, and a second current flowing from the reference line REFL to the touch sensor electrode TSE by passing through the touch transistor TTR. The first current may pass through a first current path CP1 flowing from the reference line REFL to the light emitting elements R, G, B and W by passing through the second switching transistor TR2 and flowing to the common power line VS SL by passing through the cathode electrode CE of the light emitting elements R, G, B and W. The second current may pass through a second current path flowing from the reference line REFL to the touch sensor electrode TSE by passing through the touch transistor TTR and flowing from the touch sensor electrode TSE to the common power line VSSL by passing through the cathode electrode CE of the light emitting elements R, G, B and W. The light emitting elements R, G, B and W of the plurality of pixels P1, P2, P3 and P4 may emit light of a predetermined or selected color by the first current.

The pixels P1, P3 and P4 corresponding to normal touch sensors TS1, TS3 and TS4 may be different from the pixel P2 corresponding to the defective touch sensor TS2 in the amount of the first current. The touch sensor electrode TSE of the normal touch sensors TS1, TS3 and TS4 may be electrically separated from the cathode electrode CE of the light emitting element. Therefore, a current may not flow to the touch sensor electrode TSE of the normal touch sensors TS1, TS3 and TS4. That is, the first current having the amount the same as or similar to that of the current flowing from the reference line REFL to the common power line VSSL may flow to the pixels P1, P3 and P4 corresponding to the normal touch sensors TS1, TS3 and TS4.

On the other hand, the touch sensor electrode of the defective touch sensor TS2 may be electrically connected to the cathode electrode CE of the light emitting element. Therefore, as shown in FIG. 14, the second current of the currents flowing from the reference line REFL to the common power line VSSL may flow along the second current path CP2. The first current having the amount obtained by subtracting the second current from the current flowing from the reference line REFL to the common power line VSSL may flow to the pixel P2 corresponding to the defective touch sensor TS2. As a result, the first current flowing to the pixel P2 corresponding to the defective touch sensor TS2 has the amount smaller than that of the first current flowing to the pixels P1, P3 and P4 corresponding to the normal touch sensors TS1, TS3 and TS4 as shown in FIG. 15.

In the transparent display panel 110 according to one embodiment of the present disclosure, a current flowing to the light emitting elements R, G, B and W of the plurality of pixels P1, P2, P3 and P4 may be measured to detect the defective touch sensor TS. In the transparent display panel 110 according to one embodiment of the present disclosure, the pixel P in which a current flowing to the light emitting elements R, G, B and W is smaller than a reference value may be determined as a short-circuit point SCP, and the touch sensor TS disposed at the short-circuit point SCP may be detected as the defective touch sensor.

In the transparent display panel 110 according to one embodiment of the present disclosure, when the defective touch sensor TS is detected, the touch connection portion TC for connecting the defective touch sensor TS with the touch bridge line TBL may be subjected to laser cutting, so that the defective touch sensor TS and the touch bridge line TBL may be electrically separated from each other. As a result, the other touch sensors TS of the corresponding touch block TB may be normally operated.

In the transparent display panel 110 according to one embodiment of the present disclosure, the touch connection line TCL may be subjected to laser cutting by the touch connection portion TC. In the transparent display panel 110 according to one embodiment of the present disclosure, the touch connection line TCL provided in the same layer as the light shielding layer LS may be cut by a laser, so that a repair process may be performed without damaging the light emitting element provided over the upper portion.

As described above, in the transparent display panel 110 according to one embodiment of the present disclosure, the defective touch sensor TS may be exactly detected in one touch block TB in units of pixel. Therefore, the transparent display panel 110 according to one embodiment of the present disclosure may reduce a touch defect rate and improve a touch recognition rate.

Also, in the transparent display panel 110 according to one embodiment of the present disclosure, it is not required to detect a touch block, in which the defective touch sensor TS is included, among the plurality of touch blocks TB. That is, in the transparent display panel 110 according to one embodiment of the present disclosure, inspection in units of touch block is not required, and the defective touch sensor TS may be detected from the plurality of touch sensors TS at a time using the touch transistor TTR for connecting the reference line REFL with the touch sensor TS. Therefore, the transparent display panel 110 according to one embodiment of the present disclosure may shorten the inspection time.

Also, in the transparent display panel 110 according to one embodiment of the present disclosure, the defective touch sensor may be detected using only a touch transistor TTR connected to the existing reference line REFL. In the transparent display panel 110 according to one embodiment of the present disclosure, since separate signal lines for sensing the voltage of the touch sensor TS are not required, transmittance may be more improved than the structure in which the voltage of the touch sensor TS is sensed using a separate sensing line.

According to the present disclosure, the following advantageous effects may be obtained.

In the present disclosure, the touch sensor electrode of the touch sensor and the cathode electrode of the light emitting element are formed using the undercut structure at the same time, so that the touch process may be simplified and a separate mask for the touch sensor electrode is not additionally required.

Also, in the present disclosure, the defective touch sensor may be easily detected in units of pixels by using the touch transistor for connecting the reference line with the touch sensor.

Also, in the present disclosure, inspection in units of a separate touch block is not required, and the defective touch sensor may be detected at a time using the touch transistor. Therefore, in the present disclosure, the time for detecting the defective touch sensor may be shortened.

Also, in the present disclosure, the touch transistor is connected to the existing reference line, so that a separate signal line for sensing the voltage of the touch sensor may not be added. In the present disclosure, transmittance may be more improved than the structure in which the voltage of the touch sensor is sensed using a separate sensing line.

It will be apparent to those skilled in the art that the present disclosure described above is not limited by the above-described embodiments and the accompanying drawings and that various substitutions, modifications and variations can be made in the present disclosure without departing from the spirit or scope of the disclosures. Consequently, it is intended that all variations or modifications derived from the meaning, scope and equivalent concept of the claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transparent display device, comprising:
a substrate provided with a transmissive area and a non-transmissive area, the transmissive area being an area through which externally incident light passes;
a touch sensor provided in the transmissive area over the substrate, the touch sensor including a touch sensor electrode;
a pixel provided in the non-transmissive area over the substrate, the pixel including a plurality of light emitting elements, each of the plurality of light emitting elements including an anode electrode, a light emitting layer and a cathode electrode;
a reference line provided in the non-transmissive area;
a plurality of switching transistors connecting the reference line with each of the plurality of light emitting elements; and
a touch transistor connecting the reference line with the touch sensor.

2. The transparent display device of claim 1, further comprising a scan line provided in the non-transmissive area, to which a scan signal is applied,
wherein each of the plurality of switching transistors has a gate electrode connected to the scan line, and is turned on to connect the reference line with the light emitting element when the scan signal is applied through the scan line.

3. The transparent display device of claim 1, further comprising a gate-on voltage line provided in the non-transmissive area, to which a gate-on voltage is applied,
wherein the touch transistor has a gate electrode connected to the gate-on voltage line, and is turned on to connect the reference line with the touch sensor when the gate-on voltage is applied through the gate-on voltage line.

4. The transparent display device of claim 1, wherein the touch transistor includes:
a gate electrode connected to a gate-on voltage line;
an active layer at least partially overlapped with the gate electrode;
a source electrode having one end connected to the reference line and the other end connected to the active layer; and
a drain electrode having one end connected to the active layer and the other end electrically connected to the touch sensor electrode.

5. The transparent display device of claim 1, wherein the touch transistor overlaps at least part of the touch sensor.

6. The transparent display device of claim 1, wherein a plurality of touch sensors is provided and a plurality of pixels is provided, and
the plurality of touch sensors are disposed to correspond to the plurality of pixels one-to-one.

7. The transparent display device of claim 1, wherein the cathode electrode of the light emitting element is disposed in the same layer as the touch sensor electrode of the touch sensor.

8. The transparent display device of claim 7, further comprising a first undercut structure provided in the transmissive area, the first undercut structure having a planar closed shape,
wherein the cathode electrode and the touch sensor electrode are separated from each other by the first undercut structure.

9. The transparent display device of claim 7, wherein a plurality of touch sensors is provided and a plurality of pixels is provided, and
the plurality of touch sensors are disposed to correspond to the plurality of pixels one-to-one.

10. The transparent display device of claim 9, further comprising a common power line coupled to the cathode electrode,
wherein a defective touch sensor, in which a short-circuit is present between the cathode electrode and the touch sensor electrode, among the plurality of touch sensors is detected based on a current flowing to the plurality of light emitting elements when a different voltage is applied to each of the reference line and the common power line.

11. The transparent display device of claim 10, wherein a current flowing from the reference line to the common power line includes a first current flowing from the reference line to the plurality of light emitting elements by passing through the switching transistor and a second current flowing from the reference line to the touch sensor electrode by passing through the touch transistor when the short-circuit is present between the cathode electrode and the touch sensor electrode.

12. The transparent display device of claim 10, wherein the plurality of light emitting elements included in the pixel corresponding to the defective touch sensor have a smaller amount of current than the plurality of light emitting elements included in a pixel corresponding to a normal touch sensor.

13. The transparent display device of claim 1, further comprising:
a plurality of touch lines provided in the non-transmissive area, to which a touch sensing voltage is applied;
a touch bridge line connected to one of the plurality of touch lines; and
a touch connection portion connecting the touch bridge line with the touch sensor.

14. The transparent display device of claim 13, wherein the touch connection portion connected to the touch sensor, in which a short-circuit is present between the cathode electrode and the touch sensor electrode, is cut by a laser.

15. A transparent display device, comprising:
a substrate provided with a transmissive area and a non-transmissive area, the transmissive area being an area having transmittance of external light that exceeds about 90%;
a touch sensor provided in the transmissive area over the substrate, the touch sensor including a touch sensor electrode;
a pixel provided in the non-transmissive area over the substrate, the pixel including a plurality of light emitting elements, each of the plurality of light emitting elements including an anode electrode, a light emitting layer and a cathode electrode;
a reference line provided in the non-transmissive area;
a plurality of switching transistors connecting the reference line with each of the plurality of light emitting elements; and
a touch transistor connecting the reference line with the touch sensor.

16. The transparent display device of claim 15, further comprising:
a touch transistor under the touch sensor electrode;
a first touch contact electrode in contact with the touch transistor and the touch sensor electrode; and
a first organic pattern that overlaps the first touch contact electrode;

wherein the touch sensor electrode extends beneath the first organic pattern to contact the touch contact electrode.

17. The transparent display device of claim 15, wherein the reference line includes a reference connection line that overlaps the cathode electrode and the touch sensor electrode.

18. A transparent display device, comprising:
- a substrate provided with a transmissive area and a non-transmissive area, the transmissive area being an area having transmittance of external light that exceeds transmittance of the non-transmissive area;
- a touch sensor electrode provided in the transmissive area over the substrate;
- a pixel provided in the non-transmissive area over the substrate, the pixel including a plurality of light emitting elements, each of the plurality of light emitting elements including an anode electrode, a light emitting layer and a cathode electrode, the cathode electrode being disposed in the same layer as the touch sensor electrode; and
- a first undercut structure provided in the transmissive area, wherein the cathode electrode and the touch sensor electrode are separated from each other by the first undercut structure.

19. The transparent display device of claim 18, further comprising an encapsulation layer, wherein the encapsulation layer extends into the first undercut structure so as to be underneath the cathode electrode.

20. The transparent display device of claim 18, further comprising:
- a second touch electrode;
- a second undercut structure;
- a second pixel including a second cathode electrode, the second cathode electrode and the second touch electrode being a continuous layer that overlaps the second undercut structure;
- a touch bridge line associated with the second touch electrode; and
- a touch connection portion associated with the touch bridge line and the second touch electrode, the touch connection portion being cut so that the second touch electrode and the touch bridge line are electrically separated from each other.

* * * * *